US008672054B2

(12) United States Patent
Frenken

(10) Patent No.: US 8,672,054 B2
(45) Date of Patent: Mar. 18, 2014

(54) HYDRAULICALLY ACTUABLE HAND TOOL

(75) Inventor: Egbert Frenken, Helnsberg (DE)

(73) Assignee: Gustav Klauke GmbH, Remscheid (DE)

( * ) Notice: Subject to any disclaimer, the term of this patent is extended or adjusted under 35 U.S.C. 154(b) by 646 days.

(21) Appl. No.: 12/147,189

(22) Filed: Jun. 26, 2008

(65) Prior Publication Data

US 2009/0008118 A1 Jan. 8, 2009

(30) Foreign Application Priority Data

Jul. 2, 2007 (DE) ........................ 10 2007 030 644

(51) Int. Cl.
*B23B 31/38* (2006.01)

(52) U.S. Cl.
USPC ........................ 173/170; 173/169; 72/453.15

(58) Field of Classification Search
USPC ............ 173/170, 169, 11; 72/453.15, 453.16, 72/409.06, 414; 29/715, 720
See application file for complete search history.

(56) References Cited

U.S. PATENT DOCUMENTS

| | | | | |
|---|---|---|---|---|
| 3,082,898 | A * | 3/1963 | Bosch | 29/243.525 |
| 4,265,347 | A | 5/1981 | Dischler | |
| RE31,957 | E * | 7/1985 | Olsson | 173/169 |
| 5,044,568 | A * | 9/1991 | Shigemizu | 241/169 |
| 5,727,417 | A * | 3/1998 | Moffatt et al. | 72/453.03 |
| 5,924,497 | A * | 7/1999 | Spooner et al. | 173/169 |
| 6,729,104 | B2 * | 5/2004 | Marshall | 53/331 |
| 7,421,877 | B2 | 9/2008 | Frenken | |
| 2005/0188834 | A1 * | 9/2005 | Beule | 91/422 |
| 2006/0272381 | A1 * | 12/2006 | Ayer et al. | 72/453.16 |

FOREIGN PATENT DOCUMENTS

DE 20 2006 001 301 4/2007

* cited by examiner

*Primary Examiner* — Thanh Truong
*Assistant Examiner* — Nathaniel Chukwurah
(74) *Attorney, Agent, or Firm* — Klintworth & Rozenblat IP LLC

(57) ABSTRACT

A hand tool that is preferably hydraulically actuable includes a working head and a body unit that remains in place with respect to the head, drive elements for driving the working head being provided in the body unit, for example a hydraulic pump and a hydraulic supply, a switching movement also allowing a powered movement of one or more working parts of the working head to be triggered and the working head being swivelably connected to the body unit in a rotary connection region. In order to configure and develop a hand tool so that safe working is assured by virtue of unambiguous and clear handling, by swivelling of the body unit relative to the working head about an axis of rotation provided in the region of the rotary connection of the working head to the body unit, switching over can be carried out with regard to the powered movement of the working part.

18 Claims, 16 Drawing Sheets

HYDRAULICALLY ACTUABLE HAND TOOL

FIELD OF THE INVENTION

The invention relates to a hand tool that is preferably hydraulically actuable and comprises a working head and a body unit that remains in place with respect to the head, drive elements for driving the working head being provided in the body unit, for example a hydraulic pump and a hydraulic supply, a switching movement also allowing a powered movement of one or more working parts of the working head to be triggered and the working head being rotatably connected to the body unit in a rotary connection region.

BACKGROUND OF THE INVENTION

Hand tools of the type in question are known, for instance not only conventional hand tools for two-handed operation but also for example electrohydraulically operating hand tools of lighter construction for operation with only one hand. Such hand tools serve for example in the sanitary sector for pressing pipe connections, or else in the electrical sector for pressing cable lugs onto the ends of electric cables. With the lighter hand tools for use with only one hand, hydraulic forces of for example 3 tonnes are achieved. In this connection, reference is made for example to DE 10216213 A1 which United States counterpart is U.S. Pat. No. 7,421,877. The content of this patent application and accordingly its United States counterpart patent are is hereby incorporated in full in the disclosure of the present invention, including for the purpose of incorporating features of this patent application and accordingly its United States counterpart patent in the claims of the present invention.

In the case of the known hand tool, the working head is connected to the body unit by means of a thread. This, however, is only to allow any required changing of a working head to be performed, or maintenance work to be carried out. The working part is a pivotable pressing jaw, which can be moved under force by hydraulic movement of a piston associated with the working head against a pressing jaw that is for example fixed.

Apart from such hydraulically actuated hand tools, hand tools of this type actuated by an electric motor are also known. In this respect, reference is made for instance to DE 202006001301 U1 and DE 2709946 C2. Here, the working parts comprise pressing jaws, each of which is power-actuated.

In the case of the known hand tools, an infeed movement, that is to say powered actuation, of the working part is brought about by hydraulic pressure, or by for example a spindle adjustment by means of an electric motor. For this purpose, a first switching actuation with a switching button is required. Another movement of the working part, in particular a return movement after work has been performed, that is to say for example after completion of a pressing operation, often takes place automatically, to be specific in response to the triggering of a return valve in the case of a hydraulic device, or it must be triggered by further actuation of a lever or switch, the latter for instance in the case of an electrical device.

In particular in the case of difficult operating conditions for such a hand tool, for instance on construction sites or in the mining sector, efforts are being made to find a form of actuation that involves definite and clear handling.

SUMMARY OF THE INVENTION

On the basis of the prior art described above, an object of the invention is to configure and develop a hand tool of the specified type in such a way that dependable working is ensured by means of definite and clear handling.

One possible solution for achieving the object is given by the subject matter of Claim 1, it being provided that swivelling of the body unit relative to the working head about an axis of rotation provided in the region of the rotary connection of the working head to the body unit allows switching over to be carried out with regard to the powered movement of the working part. Such a configuration is suitable in particular whenever rotational blocking of the working head occurs on account of the operating circumstances of the hand tool. On the other hand, two-handed actuation may also be adopted, the working head or the body unit being firmly held and the respective other part of the device being turned. Here, the actuation is primarily in the sense of a switching-over action, that is to say a direction of movement of the working part can be influenced or reversed. Independently of this, it may be provided that the working capability of the hand device as such, that is to say, in the case of a hydraulic device, the working of the pump, is started by a separate switching button. With regard to the rotary connection region, the threaded connection that also already exists in principle in the case of the known devices may be used. As is still to be explained in detail further below, precautionary measures may be taken to ensure that complete unscrewing of the working head does not unintentionally occur. On the other hand, independently of the threaded connection, a separate rotary connection region may also be provided, this region then preventing a change in the axial distance between the working head and the body unit from occurring in the course of turning.

Other features of the invention are explained below, also in the description of the figures, often in their preferred association with the subject matter of Claim 1 or with features of further claims. They may, however, also be of importance in association with just individual features of Claim 1, or of the respective further claim, or in each case independently.

For instance, a preferred configuration is also provided by it being possible to fix a swivelled position of the working head relative the body unit; for instance, in order to be able to retain easily the same swivelled position throughout a number of working operations; or else in order to retain a secured swivelled position between the working head and the body unit in the course of the powered actuation of the working part then performed.

In further detail, it is also provided that the body unit has a first piston, which, in the course of the switching-over movement, turns about the longitudinal axis of the piston, the axis extending in the direction of movement of the piston. This is generally achieved by a direct rotational coupling between the body unit and the first piston. In this way, the swivelled position of the first piston can be used for the desired switching-over action; this then also being brought about by the switching being influenced at the same time, for example even just secured, by the possible longitudinal movement of the piston.

It is also preferred for the aforementioned first piston to be coupled to the working head. Direct coupling between the first piston and the working head can be achieved. The coupling may in this way be restricted to the part that is, in any case, longitudinally movable, the first piston and the associated region of the working head. It is particularly preferred in this connection that a swivelled position of the first piston relative to the working head can be fixed by direct abutment between the first piston and the working head. The first piston can be made to move-against the working head and the abutment with the working head thereby obtained serves at the same time for fixing the swivelled position.

The fixing of the desired swivelled position is performed more preferably as a result of the hydraulic loading of the first piston on the piston surface facing away from the working head. The surface of the first piston opposite from this piston surface is accordingly pressed under pressure against the working head, after which further swivelling is only possible after the pressure loading on the piston has been relieved. This achieves sufficiently high frictional force of the portions located on one another, for example end faces, of the interacting portions of the piston and the working head. Apart from fixing purely on the basis of non-positive engagement, positive interengagement of portions of the piston and the working head can also additionally or alternatively fix the desired swivelled position. Alternatively, the fixing may also be effected for example by the action of spring force on the piston in the direction of the working head, additionally also by mechanical means, such as for example by a catch or the like that can only be released again deliberately. In the case of spring action in the direction of the fixing position, it is also possible for example for a helical spring or the like to act upon the piston surface facing away from the working head. Such a spring force may be made triggerable, the triggering taking place after reaching the desired swivelled position between the first piston and the working head.

It is further preferred for the first piston to be swivelable with respect to the working head in an angle-limited manner, so further with respect to the longitudinal axis of the piston by an angle of preferably less than 360°, for example in an angular range from 1° to 90°, more preferably in a range from 10° to 30°. In one embodiment of the subject matter of the invention, an angular adjustability of the first piston with respect to the working head of approximately 15° to 25° is prescribed, so further for example approximately 20°. An angular position that is easy for the user to reach from the wrist is preferred. Within this angle-limited swivelability of the first piston, at least two different operational functions of the working head can preferably be set. These two functional positions correspond more preferably to the end positions of swivelling of the first piston with respect to the working head. In addition, intermediate positions—which optionally can also be fixed—of the first piston are possible, the intermediate positions allowing further functions to be triggered, a blocking position of the working head in its working position representing one example of a further function.

In a further preferred configuration, the first piston is swivelably coupled to a second piston, accommodated in a second cylinder.

The second cylinder is preferably formed here in the working head. The working head itself may form the cylinder. Different effects on the second piston, which is slidingly displaceable in the second cylinder, can be achieved by the different swivelled positions of the first piston, so further for example switching of the second piston in the direction of advance or return. In addition, alternatively or else in combination with the running direction of the second piston, the force acting upon the second piston, and in addition also the speed of displacement of the second piston, can also be specifically controlled by means of the swivelled position of the first piston with respect to the working head.

In one configuration of the subject matter of the invention, the longitudinal axes of the two pistons, that is to say of the first piston disposed in the hand tool and of the second piston provided in the working head, may be arranged to be in the same direction, one after the other, further also with the formation of a common axis that passes through both pistons centrally in the longitudinal direction, or in the direction of movement. In a preferred configuration, the longitudinal axes of the two pistons run differently, that is to say to include an angle of less than 180° with respect to one another, it being quite possible further for these axes also to be disposed offset from one another in a plane directed transversely with respect to the extent of the longitudinal axes. The included angle referred to above accordingly relates to a projection of the longitudinal axes of the pistons onto a projection plane-viewed perpendicularly with respect to the transverse plane of the longitudinal axes. The angle included by the longitudinal axes of the pistons may have a value of for example 15° to 170°, further for example 45° to 135°, the first and second cylinders more preferably running in a T-shaped manner with respect to one another. Here it is not necessary for the included angle to be a right angle. It may well have a value other than 90°, such as for example a value from 60° to 120°, further for example a value from 75° to 105°.

In a further preferred configuration of the subject matter of the invention, the pressing between the first piston and the working head for fixing the swivelled position of the first piston is effected by the same hydraulic medium that also moves the second piston. Accordingly, in the same way as the first piston, the second piston is acted upon by the hydraulic medium that is stored in the hand tool, thus also in accordance with the build-up of pressure developed by a hydraulic pump provided in the hand tool. Accordingly, no separate medium (hydraulic medium) is required for the actuation of the second piston provided in the working head. The actuation of the working head is correspondingly dependent on an association with the hydraulically actuable hand tool. For the hydraulic actuation of the second piston in the working head, the first piston is formed such that it is possible for the hydraulic medium to flow through the first piston. Therefore, the first piston has flow paths, so further in particular run-in and run-off flow paths for the hydraulic medium, the paths passing, in a preferred configuration, through the first piston in the manner of conduits that are substantially aligned along the longitudinal axis of the piston. These flow paths preferably serve only for the through-flow of the hydraulic medium acting on the working head or its piston.

To make it possible for the first piston to be swivelable with respect to the working head and for the desired swivelled position to be fixed, the first piston is displaceable in the longitudinal direction of the piston within the first cylinder that guides the piston, this more preferably over a path of a few millimeters, so in particular over a path of 0.1 mm to 5 mm, preferably 1 mm to 3 mm. Since the first piston primarily serves only as a setting element to be fixed, its axial displaceability can be limited to a minimum value that permits fixing, and re-release. After overcoming this displacement path, the associated piston surface of the first piston enters into frictional engagement with a cylinder end face, which is formed by the working head. For this purpose, in a preferred configuration, the first piston is formed with effective areas of different sizes, a larger effective area being provided on the inflow side of the first piston than on its outflow side. In a further preferred configuration, the smaller effective area on the outflow side is provided by a portion of the surface on the outflow side being connected to the substantially pressure-free hydraulic return, the hydraulic return being effected by a flow path passing through the first piston. This results in a reduced effective area of the piston surface that can be brought into an operational position with respect to the cylinder base as compared with the pressure-applying area of the piston. A sliding displacement of the first piston for fixing the piston in the desired swivelled position is then also made possible if hydraulic medium from a previous outflow from the second cylinder or from the working head is present on the piston surface on the outflow side, this portion of hydraulic medium also being able to escape, substantially without pressure, via the hydraulic return provided in the first piston, when the downstream flow paths to the second cylinder or to the second piston are blocked. The differential piston formed in this way can always be displaced into the fixing position. With a preferred oil pressure of approximately 40 N/mm$^2$, the first piston acts, as a result of the proposed area ratios, with a multiple of this value against the cylinder base, so for example with 3 to 6 times, further for example with 2 times, the above value, that is for instance with 80 N/mm$^2$. The metallically interacting surfaces of the piston and the cylinder base thus form an oil-tight junction.

Apart from the hydraulic return, a hydraulic feed is also provided at the same time in the first piston, for applying pressure to the second piston disposed in the working head. For this hydraulic feed, an inflow opening is provided on the inflow side of the first piston, for entry into the first piston of the hydraulic medium that can at the same time also displace the first piston into the fixing position. The inflow opening has a pre-loaded valve, which only releases the inflow opening for the hydraulic medium to pass through the piston when a threshold value predetermined by the pre-load is exceeded. This threshold value is only reached after the first piston has reached the fixing position in relation to the working head by way of a sliding displacement. Therefore, pressing of the first piston against the working head at the beginning of the pressure build-up on the inflow side of the first piston can be achieved by generating an initial pressure by means of the valve formed as a pressure-limiting valve. As a result, at the beginning of delivery, the first piston is displaced into the fixing position within the first cylinder with a force below the valve threshold value, overcoming friction of seals. Apart from the frictional fixing of the swivelling between the first piston and the working head; sealing is hereby achieved also in the region of abutment of the piston surface on the outflow side and the facing cylinder end face. After exceeding the valve threshold value in the inflow opening and accordingly after reaching the sealing position in the region of the interface between the first piston and the working head, the valve activates the hydraulic feed within the first piston, to make hydraulic medium act upon the second piston disposed in the working head. As the hydraulic pressure acting on the inflow side of the first piston is relieved, first of all the valve disposed in the inflow opening closes. In the course of further pressure relief, the first piston, acting as a differential piston, is displaced back from its sealing fixing position by the final excess pressure acting on the outflow side. Any contaminants, such as swarf or the like, located in the sealing region between the piston surface on the outflow side of the first piston and the opposing sealing surface in the region of the cylinder end wall can accordingly be flushed out by means of the hydraulic medium.

The second piston, guided in the working head within the second cylinder formed there, is formed as a double-acting piston or differential piston and can be acted upon by the hydraulic medium, at least for movement in one direction, but can be acted upon at the same time in opposite directions in the case of different effective sizes of piston surface. This actuation of the second piston can take place in both directions of movement of the second piston. In this respect, such actuation is preferred only in one direction of movement, more preferably during a forward displacement of the second piston from a rearward basic position. The pressure is here preferably made to act with the same pressure upon the different effective piston areas, resulting in a differential force for the movement of the second piston because of the different sizes of the piston surfaces. The second piston is more preferably subjected to pressure only on one side for the return displacement, while no pressure is present on the rearward side. Such pressure actuation on one side is, furthermore, alternatively also possible with regard to forward displacement of the piston. The various swivelled positions can optionally also be used to control the alternative pressure conditions. In a preferred configuration, the different piston areas are obtained by locating a piston rod on one of the two piston surfaces, the piston rod carrying at an end thereof a functional head that preferably protrudes beyond the cylinder. This functional head is accordingly moved by the second piston linearly in the direction of the axial extent of the second piston. In the course of the forward displacement, the functional head comprising the piston rod is pushed out of the second cylinder by the second piston, this preferably by means of actuation of the second piston on both sides. The hydraulic pressure that is also present here ahead of the second piston in the pressing-out direction allows the moving-out speed in a working position in which the functional head is for example suspended downward to be the same as when the functional head is moved out horizontally. Any forces acting upon the functional head, in particular pulling forces, also do not bring about possibly uncontrolled premature advance of the second piston. The forward displacement of the second piston in the pressing-out direction of the functional head is damped.

In the return direction, that is, to be specific, in the retracting direction with respect to the functional head, the actuation of the second piston preferably only takes place on one side, this actuation more preferably proceeding from the piston surface on the piston-rod side and thus from the smaller piston area, while the opposite, larger piston area remains free from pressure. The hydraulic medium located in this portion of the cylinder is forced by means of the larger piston surface to return through the first piston into the hydraulic supply. In a preferred configuration, the piston areas of the second piston are dimensioned such that advance and return take place at the same rates. This is preferably achieved by a 50% reduced piston area on the piston-rod side compared with the opposite piston area. Accordingly, forces of the same magnitude act upon the second piston both in the direction of advance and in the return direction. Alternatively, however, the piston areas may be in such a relation to one another that the pulling force acting in the return direction is greater than or less than the pressing-out force acting in the direction of advance.

In a development of the subject matter of the invention, the second piston has a protruding spring element at the end facing away from the functional head, for interaction with the associated cylinder base. This is preferably an elastomer part, which acts in the manner of a buffer. Accordingly, there is no hard striking against the associated cylinder base at the conclusion of the return movement. Alternatively, the spring element may for example also be a latch spring. Moreover, in a retracted, non-compressed starting position, the protruding spring element leaves a clearance between the cylinder base and the facing piston surface, for the hydraulic medium to flow in. Furthermore, the location of the spring element makes possible relative displacement, albeit minimal, of the second piston in the second cylinder, even in the position of the second piston in which is not subjected to pressure, so further in particular over a path of a few tenths of a millimeter, further for example over 0.5 mm to 2 mm. The extent of the axial protrusion of the spring element corresponds for example to approximately 1 to 5%, preferably approximately 2%, of the axial displacement path of the piston in the cylinder. Depending on the nature of use of the working head, the placing or removing of the working head from an actuating part to be actuated or entrained by means of the functional head is simplified by the relative displacement of the second piston and, via its piston rod, of the functional head, being facilitated.

For loading the second piston, which is disposed in the working head, an outflow opening and a run-off opening are formed in the end face of the first piston, the outflow opening being connected to the inflow opening on the inflow side of the piston via a channel passing through the first piston. The run-off opening on the end face serves for the hydraulic return from the second cylinder. The outflow opening and the run-off opening are separate from one another in terms of flow. In one configuration, the outflow and run-off openings may each have on the end-face side of the first piston a circular cross-section corresponding to the respectively upstream and flow paths in the first piston. It is possible as well in this respect for at least one of the openings, so further preferably the run-off opening; to be enlarged in area in cross-section compared with the downstream flow path; it is also possible for the resulting cross-sectional area of the run-off opening to be formed other than in the shape of a circle. For instance, the run-off opening may further have a portion thereof that extends radially from the flow channel connected to the run-off opening.

In a further preferred configuration, the run-off line associated with the run-off opening and formed in the first piston opens out into an intermediate region that is sealed in both directions—with respect to the direction of extent of the longitudinal axis of the piston—the intermediate region being associated with an annular space established between the outer surface of the piston and the inner surface of the cylinder in the region between two sealing regions spaced apart from each other in the axial direction. This intermediate region is hydraulically separate from the hydraulic intake region associated with the inflow side of the first piston and is flow-connected to a hydraulic reservoir.

In a development of the subject matter of the invention, in the second cylinder, associated with the working head, there are formed at least two hydraulic paths, which form openings associated with the end face, that is to say the end face on the outflow side, of the first piston. Accordingly, in the same way as the intake and run-off lines formed in the first piston, these hydraulic paths open out in the press-seating region that is sealed off with respect to the working head in the fixing position of the first piston. One of the hydraulic paths associated with the second cylinder is formed for acting upon the effective overall cross-section of the second piston, while the second hydraulic path serves for acting upon an annular space. This annular space is associated with the smaller piston area of the second piston, resulting from a piston rod that passes through this portion of the cylinder space and is connected to the piston. By means of the two hydraulic paths, the two piston areas of the second piston, formed as a differential piston, can be specifically activated. At the same time, at least one of the hydraulic paths serves as a run-off path for the hydraulic medium.

The two openings of the hydraulic paths are disposed in the region through which the outlet opening of the first piston swivels, and can accordingly both be connected to the inflow side of the first piston, in particular after displacement of the pressure-limiting valve into the open position, for the actuation according to choice of one of the two piston areas of the second piston or combined actuation of the two piston areas. At least one of the openings of the hydraulic paths is furthermore disposed here in the region through which the run-off opening of the first piston swivels, and can accordingly form the return path for the hydraulic medium to the reservoir, depending on the swivelled position of the first piston. Depending on the swivelled position of the first piston relative to the working head, and consequently also relative to the openings of the hydraulic paths, the paths can be differently associated with the outlet opening and with the run-off opening of the first piston, in order in this way to achieve different effects on the second piston, so further preferably the advance and return movement of the piston.

In a further preferred configuration of the subject matter of the invention, both openings of the hydraulic paths are disposed with respect to the outflow opening of the first piston and the region through which it swivels in such a way that it is possible for hydraulic medium to flow simultaneously through both openings. During operation, this results in the second piston, formed as a differential piston, being subjected to pressure on both sides. This configuration is preferably achieved in one of the end positions of swivelling of the first piston. In the end position of swivelling of the first piston, more preferably only one of the openings of the hydraulic path is connected to the outflow opening of the first piston, while the opening of the other hydraulic path is associated with the run-off opening of the first piston. In addition, intermediate swivelled positions, which can optionally be fixed by the engagement of a catch, are also possible, such as for example a mid-way position in which, although one of the hydraulic path openings is associated with the outflow opening of the first piston, the opening of the second hydraulic path is blocked, the opening being associated neither with the outflow opening nor with the run-off opening of the first piston. In this position, there is no displacement of the second piston, either in one direction or in the other, during operation of the hand tool, that is to say when there is a build-up of hydraulic pressure. Furthermore, a position may be provided in which the hydraulic medium acts upon the second piston for the forward displacement only on one side, to be specific on the piston surface facing away from the piston rod. Accordingly, the opening of the associated hydraulic path is associated with the outflow opening of the first piston, while the opening of the hydraulic path associated with the piston surface opposite from the piston surface that is acted upon is connected to the run-off opening of the first piston. This results in conventional circulatory operation of the hydraulic medium, whereby very high forces can be achieved.

The second piston, which in principle is freely rotatable in the second cylinder about the longitudinal axis of the cylinder, is circumferentially aligned during the return from a forwardly-displaced position, by means of a catching recess formed on the second cylinder. For example, provided on the end face of the second cylinder is a groove that widens outwardly in a wedge-shaped manner and serves for receiving in a circumferentially aligned manner a radial projection that is disposed for example in the region of the functional head. In this way it is ensured that, in the basic position, that is to say in the retracted position of the piston, the functional head in particular is always aligned in a positionally appropriate starting position.

The features described above are also of importance in the sense of a hydraulic swivel-locking mechanism as such, through which hydraulic medium passes. To this extent, it accordingly does not matter whether a working head or even a (differential) piston is provided downstream, or whether the overall device in question is a hydraulic hand tool.

BRIEF DESCRIPTION OF THE DRAWINGS

The invention is explained in more detail below on the basis of the accompanying drawing, which merely represents an exemplary embodiment and in which.

DETAILED DESCRIPTION OF THE ILLUSTRATED EMBODIMENT

Figure 1:
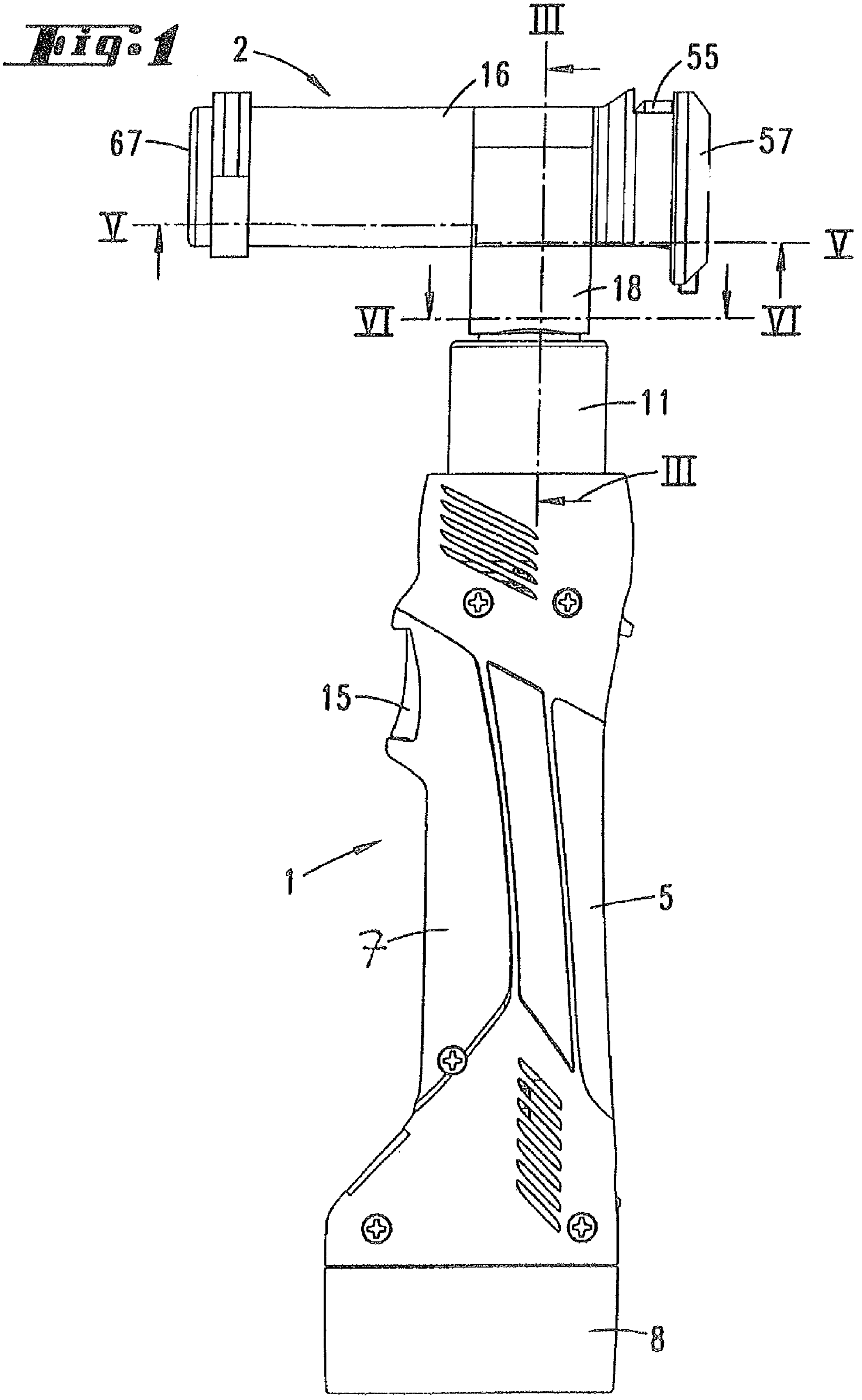
FIG. 1 shows, in side elevation, a hand tool according to the invention with a working head.
Figure 2:
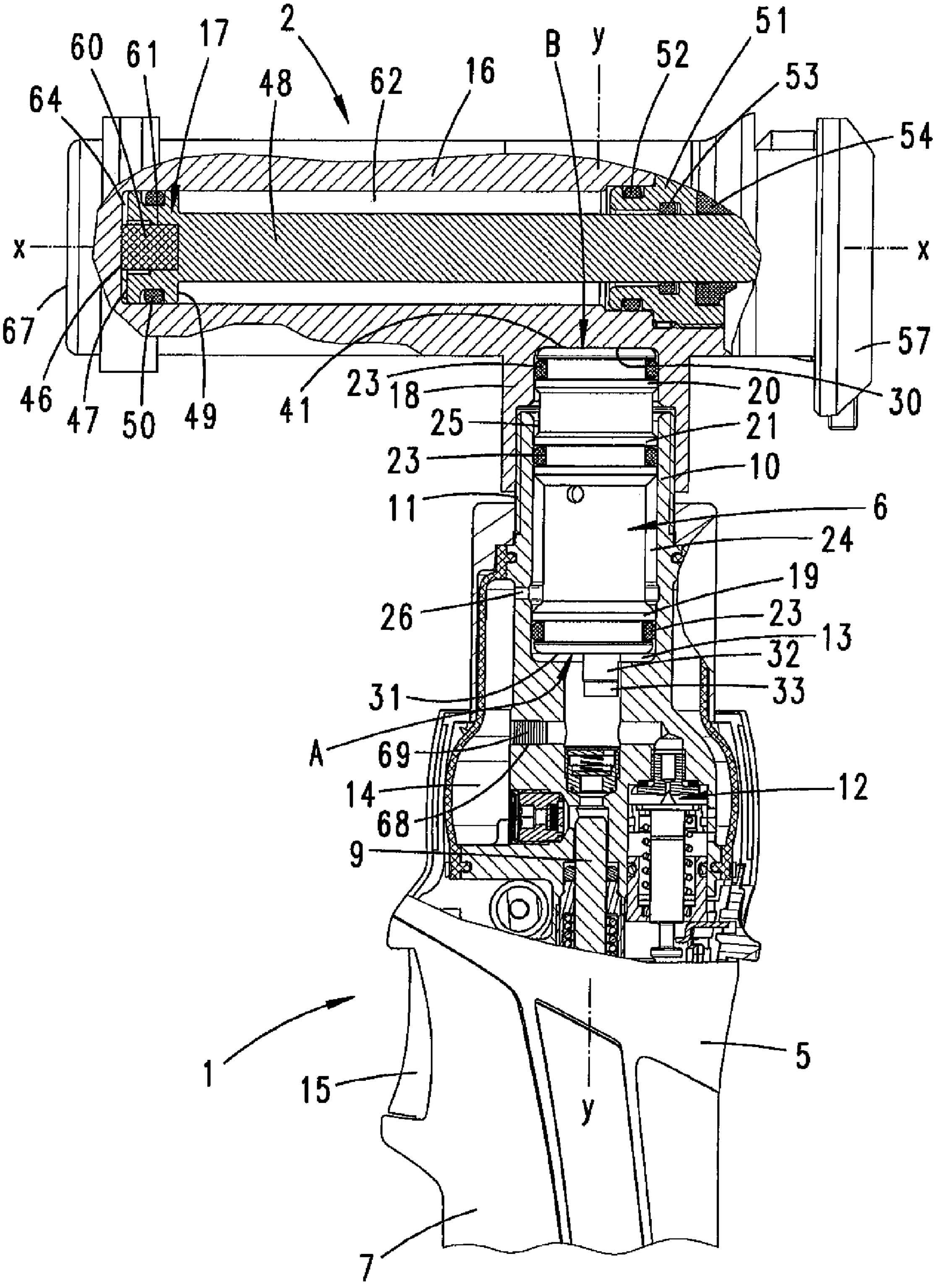
FIG. 2 shows a partially sectioned enlargement of the head region of the hand tool with the associated working head.
Figure 3:
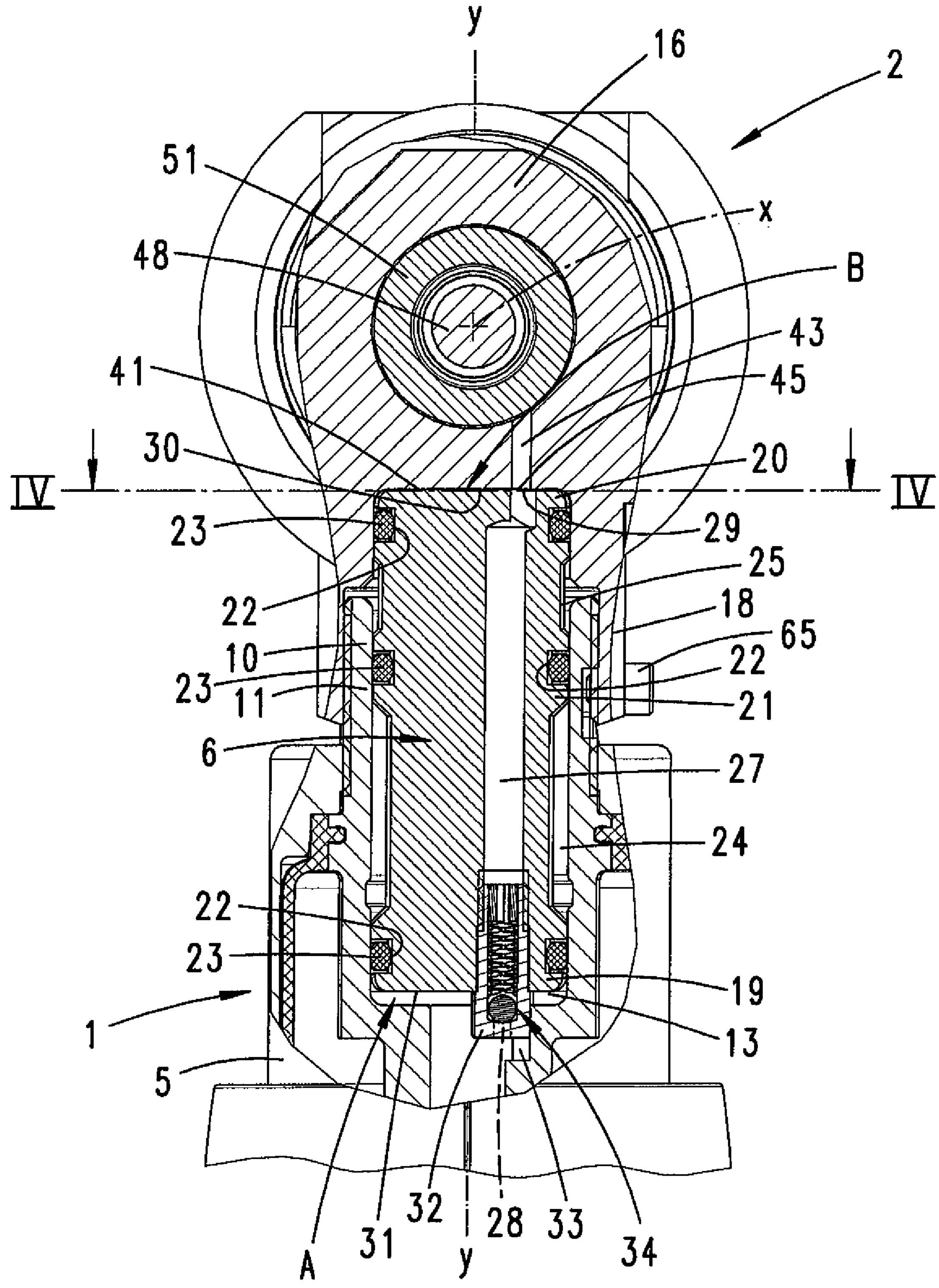
FIG. 3 shows the section along the line III-III in FIG. 1.
Figure 4:
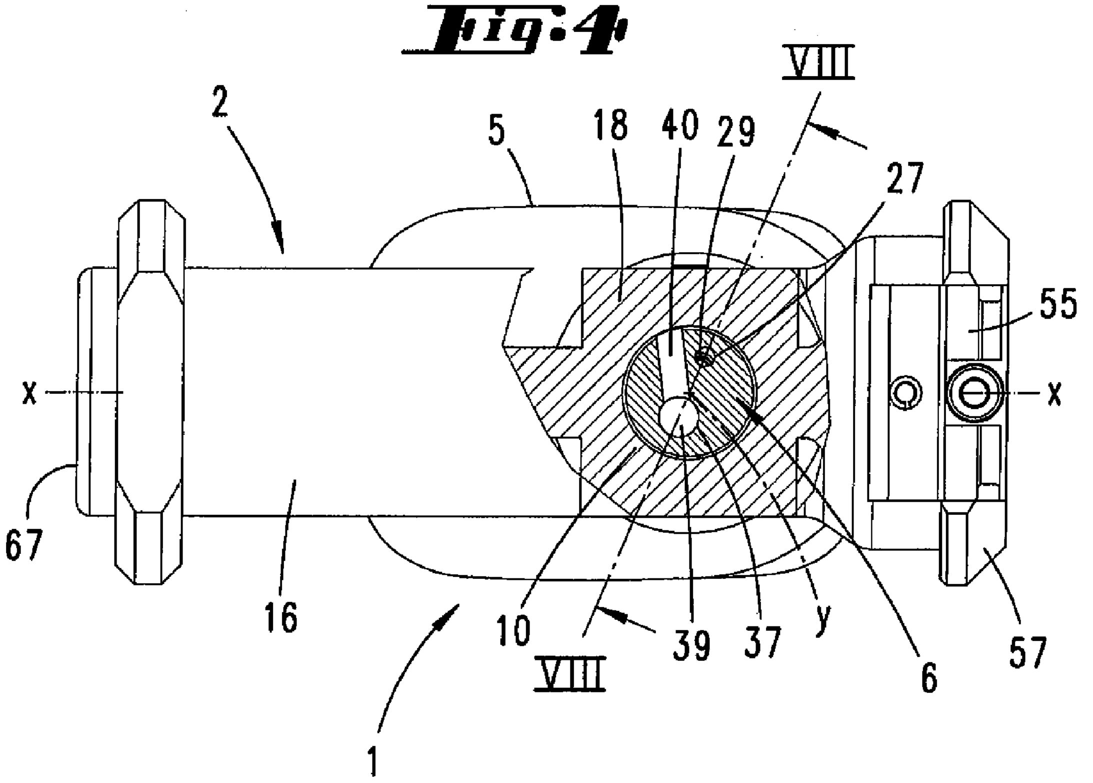
FIG. 4 shows the cross-section along the line IV-IV in FIG. 3.
Figure 5:
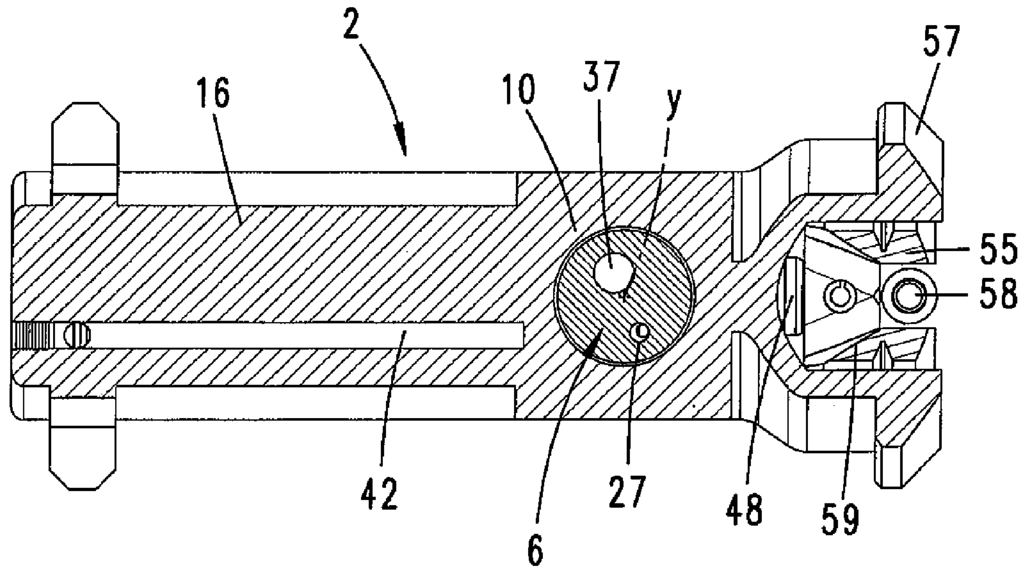
FIG. 5 shows the section along the line V-V in FIG. 1.
Figure 8:
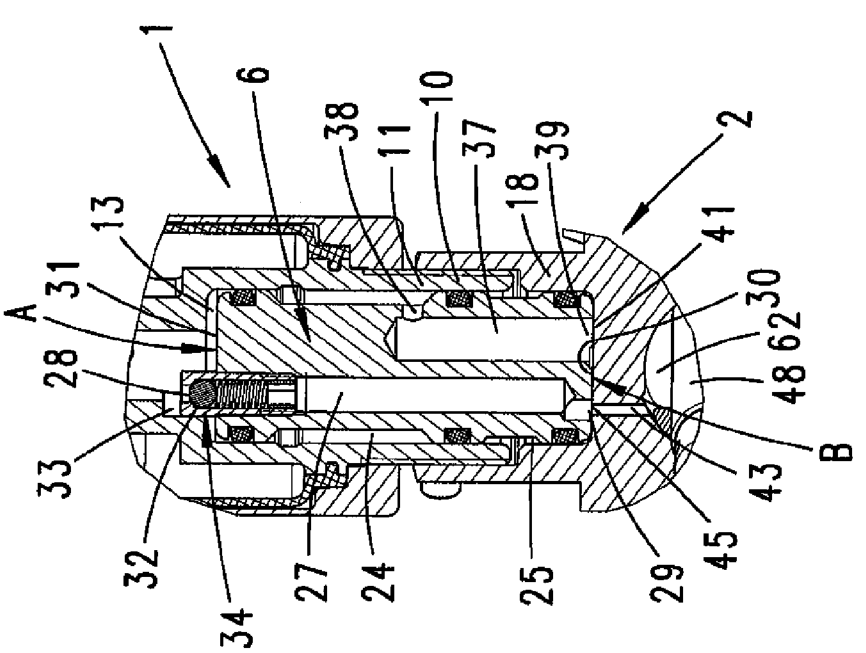
FIG. 8 shows the section along the line VIII-VIII in FIG. 4.
Figure 7:
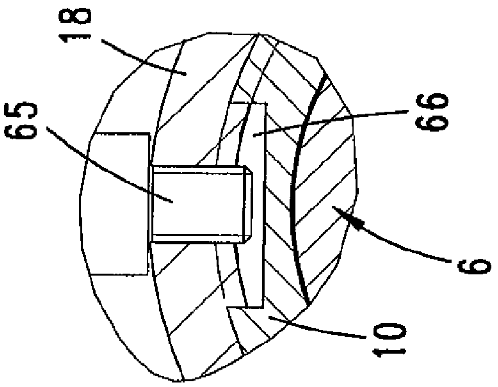
FIG. 7 shows the enlargement taken from the region designated by VII in FIG. 6.
Figure 6:
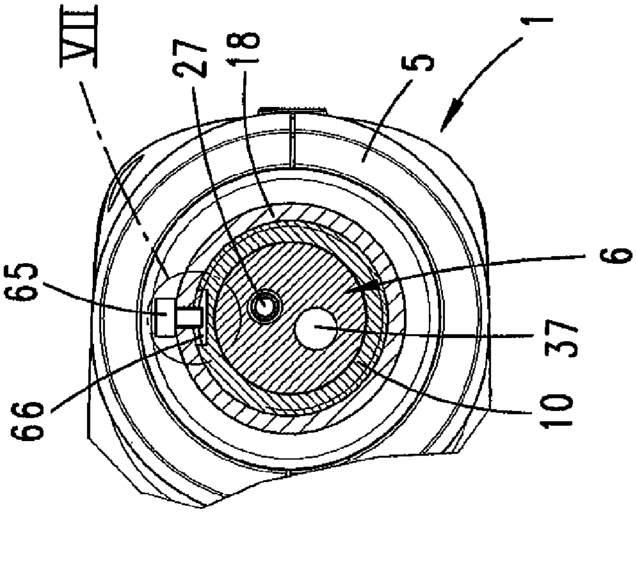
FIG. 6 shows the cross-section along the line VI-VI in FIG. 1.
Figure 9:
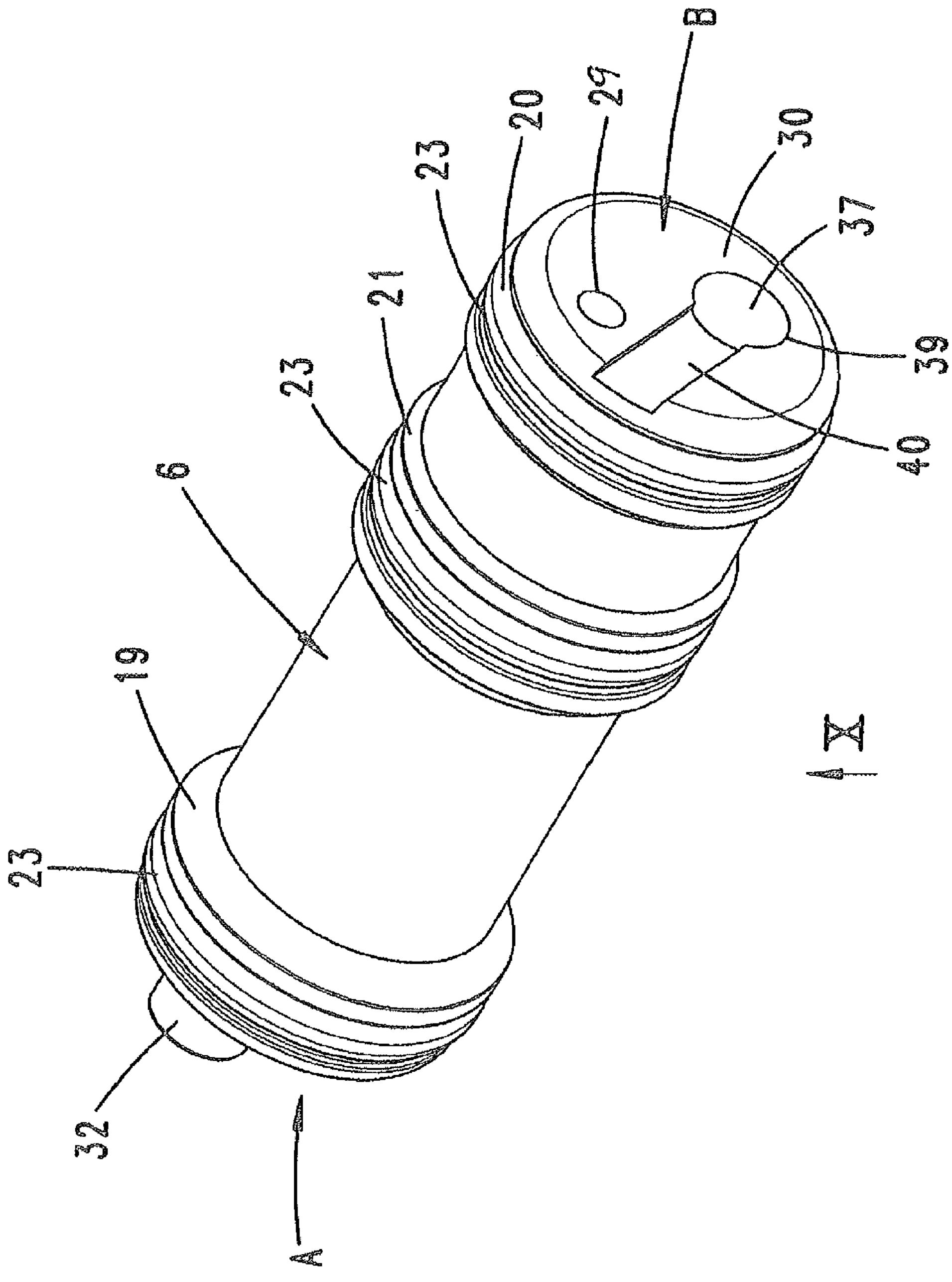
FIG. 9 shows a first piston of the hand tool in a perspective individual representation, looking at an outflow side.
Figure 10:
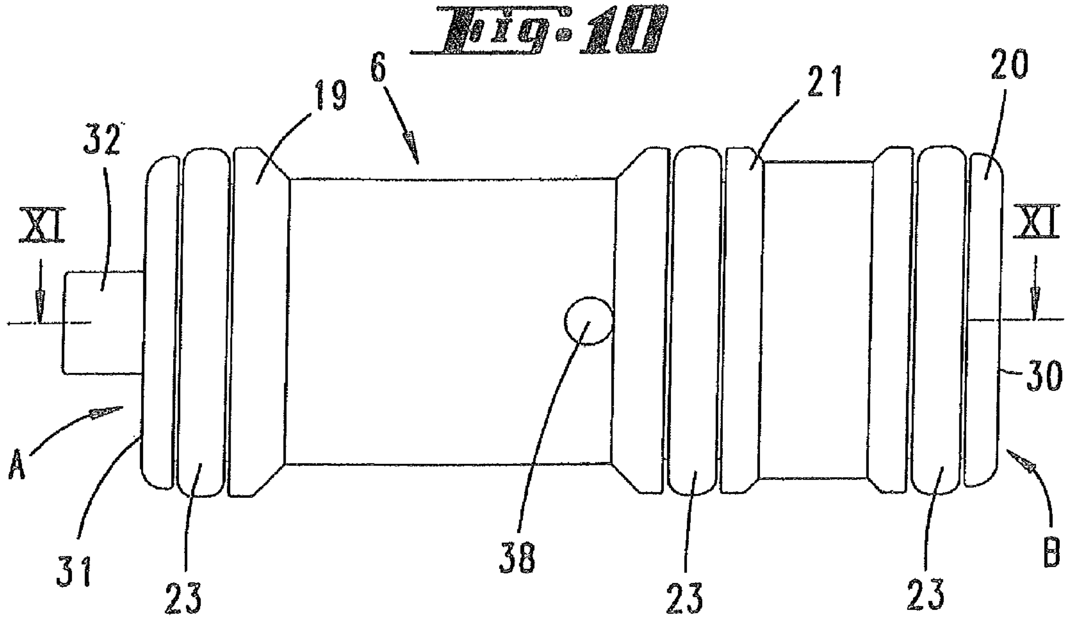
FIG. 10 shows a side view thereof.

Presented and described initially with reference to FIG. 1 is an electrohydraulic hand tool 1 (with a body unit), suitable for operation with one hand, for the actuation of a working head 2 disposed on it. The latter serves for driving out or drawing in a cutting tool 3 from or into a tool holder 4.

As can be gathered from the representations, the hand tool 1 is formed substantially in the shape of an elongate bar, which assists operation of the tool with one hand. This bar-shaped configuration is achieved by the individual subassemblies being positioned axially one after the other in the housing 5 and furthermore aligned substantially in line with a longitudinal axis y of a first piston 6 that is slidingly displaceable in a linear manner in the hand tool 1. In the region of the electric motor (not shown), the housing 5 forms a grip region 7, the diameter of the housing being chosen to be ergonomically appropriate in this grip region 7.

The electric motor is powered by a storage battery 8, which can be inserted in the axial direction of the electric motor. The storage battery can be inserted into a corresponding housing receptacle and is secured by a catch. The device may, however, also be formed for direct operation with a power plug, or be provided with a power plug in addition to the storage battery 8.

By means of the electric motor, the first piston 6 is moved along its longitudinal axis y in the hand tool 1 in a known way by means of an increase in oil pressure.

In order to convert the rotational movement of the electric motor into the oil-pressure-actuated linear displacement of the first piston 6, a gear mechanism is disposed between the electric motor and a pump. The conversion of the rotational movement by the electric motor into an oscillating pumping movement of a pump plunger 9 is achieved by means of the gear mechanism. This back and forth pumping movement takes place in the axial direction of the motor shaft and correspondingly furthermore in the axial direction of the first piston 6.

With regard to the configuration and operating mode of the gear mechanism and the pump, reference is made to DE 10216213 A1 which United States counterpart is U.S. Pat. No. 7,421,877, mentioned at the beginning, for further details.

With the oscillating movement of the pump plunger 9, the first piston 6 is actuated by oil pressure by means of a valve arrangement that is not shown any more specifically. The first piston 6 lies here in a first cylinder 10 of a head 11 on the tool side. This head 11 is provided with an external thread for interaction with a corresponding internal thread of the working head 2 that can be placed in position.

Furthermore, provided in side-by-side arrangement, that is to say offset parallel to the pump plunger 9, is a return valve 12, which is connected by a line at one end to the pressure space 13 upstream of the first piston 6. When a predefined pressure in the pressure space 13 is exceeded, this return valve 12 automatically opens and opens a path to the hydraulic reservoir 14, which surrounds the pump or the pump plunger 9 and the return valve 12 in an annular manner.

By means of a force acting on the piston surface of the first piston 6 opposite from the pressure space 13, the opening of the return valve 12 brings about a return of the first piston 6 into the unloaded basic position.

A bore 68, necessary in production engineering terms for forming the line connection of the return valve 12 and the pressure space 13 and aligned transversely to the axis y, is closed by a screw-in plug 69 to separate the pressure space 13 from the reservoir 14.

A swivelable actuating switch 15 is provided in the grip region 7 for operating the hand tool 1 and thus for switching on the electric motor.

The working head 2, substantially configured in the form of a circular cylinder, forms a second cylinder 16, in which a second piston 17 is linearly guided. The longitudinal axis x of the second piston 17 is aligned at right angles to the longitudinal axis y of the first piston 6 and intersects a prolongation of this longitudinal axis y.

Formed onto the outside of the lateral wall of the second cylinder 16 is a flange 18, which in cross-section has the shape of a circular ring and in the state in which it is associated with the hand tool 1, is aligned coaxially with the longitudinal axis y of the first piston 6. For fixing the working head 2 to the hand tool 1, this flange is provided on the inside of the wall of the flange, in the region of a radial widening of the interior space, with an internal thread that meshes with the external thread of the first cylinder 10. The portion of the flange that axially adjoins the internal thread and is rooted in the wall of the cylinder, forms on the inside of the wall a partial portion of the first cylinder 10, and accordingly forms a prolongation of the cylinder.

The first piston 6, guided in the first cylinder 10, first of all has an outside diameter that is reduced with respect to the inside diameter of the cylinder and is furthermore formed substantially as a solid body, with a length viewed in the axial direction that is approximately 0.9 to 0.98, further approximately 0.97, of the length viewed in the same direction of the first cylinder 10, including the flange portion that further defines this cylinder 10. With a piston length by way of example of about 70 mm, this results in a possible displacement path of the first piston 6 in the first cylinder 10 of about 2 mm.

Distributed over its length, the first piston 6 is provided with radially widened portions 19, 20, 21, the outside diameters of which are adapted to the inside diameter of the cylinder 10. Embedded in these widened portions 19 to 21, in correspondingly positioned peripheral annular grooves 22, the first piston 6 carries ring seals 23, which-engage against the wall of the cylinder in a sealing manner in the radially outward direction.

The widened portion 19 is formed in the end region of the first piston 6 that faces the pressure space 13. Formed at the opposite end is the second widened portion 20, for interaction with the flange portion of the working head 2 that forms the extension of the cylinder. Positioned between the portions 19 and 20 which are located at the ends is the further widened portion 21, this with an axial spacing from the portion 19 on the pressure-space side that corresponds approximately to twice the spacing from the portion 20 on the end-face side. This results in annular spaces 24 and 25, encircling the first piston 6, respectively between the portions 19 and 21 and the portions 20 and 21, the annular space 24 that is created between the portion 19 on the pressure-space side and the middle widened portion 21 being in communication with the reservoir 14 via a bore 26 that is aligned radially outwardly, transversely to the axis y.

The first piston 6 is formed for hydraulic medium to flow through it. For this purpose, it has firstly an inflow channel 27, which runs such that it is substantially offset parallel to the piston axis y, extends over the entire length of the piston 6 and thus opens out both at the inflow side A and at the outflow side B of the first piston 6, and respectively forms there an inflow opening 28 and an outflow opening 29, the inflow channel 27 having furthermore a radial offset in the outward direction in the immediate region of the outflow opening 29. The outflow opening 29 is formed as a circular opening in the end face 30 facing away from the pressure space 13.

The inflow opening 28 of the inflow channel 27 is formed in an axial continuation 32, which is screwed into the inflow channel 27 from the end face 31 of the piston 6 that faces the pressure space 13. In a way corresponding to the way in which the inflow channel 27 is disposed, this axial continuation protrudes in eccentric association beyond the end face 31, the axial continuation 32 lying furthermore with positive engagement in an associated axial slot guide 33 in the pressure space 13. This secures the first piston 6 against turning about its longitudinal axis y while continuing to permit linear displacement along the longitudinal axis y.

In an unactuated position, the inflow opening 28 is closed by a pre-loaded valve 34. In the exemplary embodiment shown, this is a pressure-controllable ball valve, with a ball 35, which can be displaced within the axial continuation 32, in parallel alignment with the longitudinal axis y, out of its sealing seat position and against the inflow opening 2 counter to a compression spring 36 acting rearwardly against the ball 35, by applying pressure via the inflow opening 28.

Figure 11:
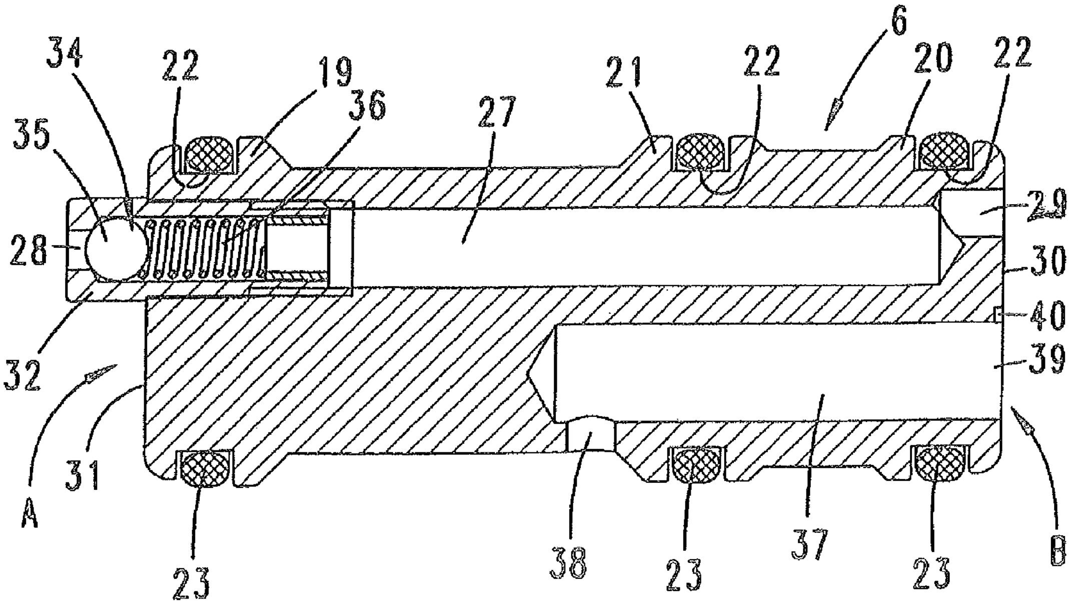
FIG. 11 shows the longitudinal section along the line XI-XI through the first piston.
Figure 12:
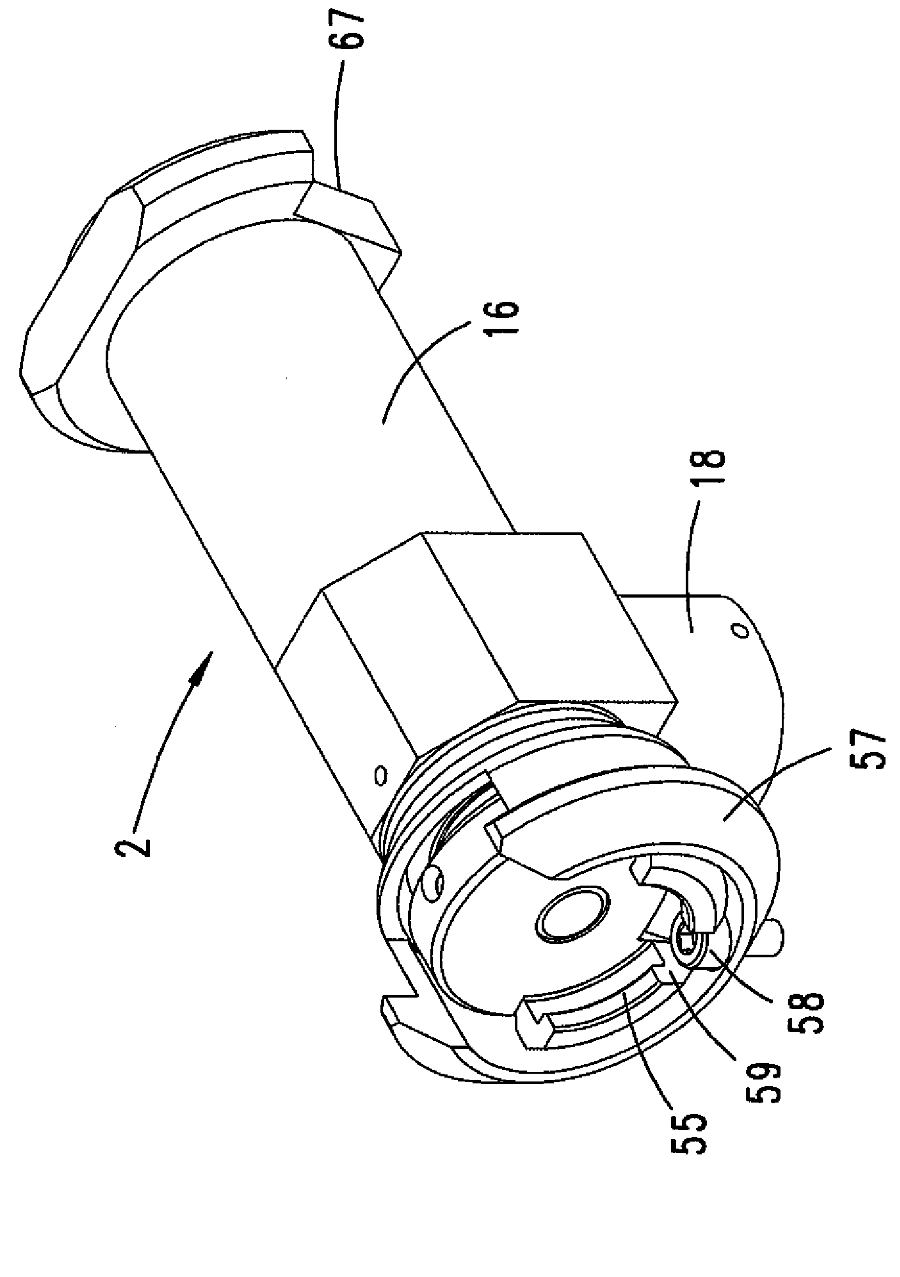
FIG. 12 shows the working head in a perspective individual representation.

Furthermore, a run-off channel 37 (compare FIG. 11) is also provided in the first piston 6. This channel likewise extends offset parallel to the longitudinal axis of the piston y, from the end face 30 of the piston 6 opposite from the pressure space 13, approximately over half the length of the extent of the piston 6, and changes there into a radially outwardly directed transverse bore 38. The latter opens out in the annular space 24, which is bounded in the axial direction between the widened portions 19 and 21 of the piston 6 and sealed off.

At the end face, the run-off channel 37 forms a run-off opening 39, which is first of all circular in outline but, in the region of the end face 30, runs into an enlarged portion 40, extending radially outward. This is formed out of the end face 30 in the manner of a recess and extends up to the peripheral edge of the end face in such a way that a prolongation of a circular line based on the longitudinal axis y and running through the middle of the outflow opening 29 that opens out in the end face 30 crosses the enlarged portion 40, this furthermore with the enlarged portion 40 and the outflow opening 29 being in adjacent association and the inclusion of an angle of approximately 30°.

The planar end face 30, aligned transversely to the piston axis y, is opposed by a likewise planar cylinder head surface 41, arranged in the same plane, at the foot of the flange 18 on the working-head side, spaced apart as the case may be by the extent of displacement of the piston 6. Two hydraulic paths 42, 43 that are formed in the working head 2 and are associated with the second cylinder 16 open out in this cylinder head surface 41. The openings 44 and 45 of said paths are disposed on a circular line based on the axis y, which, in projection onto the oppositely located end face 30 of the first piston 6, intersects the inflow opening 28 and the enlarged portion 40. Furthermore, the openings 44 and 45 are disposed offset with respect to one another by an angle of approximately 20° in the direction of the circular line.

The second piston 17, linearly displaceable in the second cylinder 16 along the longitudinal axis x, is formed as a differential piston. Therefore, this piston 17 first of all has a first piston surface 47 that faces a cylinder base 46 and the surface area of which is substantially the same as the cross-sectional area of the interior space of the cylinder.

Lying opposite this piston surface 47, a piston rod 48 is centrally formed on the piston 17, the piston rod extending coaxially with the axis x beyond the opposite end of the cylinder 16 and the diameter of the piston rod being selected so as to obtain, on the side of the piston 17 opposite from the piston surface 47, an annular piston surface 49 that surrounds the piston rod 48 radially on the outside and, in the exemplary embodiment shown, corresponds in terms of its surface area to 0.5 of the area of the opposite piston surface 47.

On the outside of its lateral surface, the second piston 17 is provided with an annular piston seal 50, which interacts in a sealing manner with the inside wall of the second cylinder 16.

The effective cylinder space 16 has a length of extent that corresponds approximately to 4 times the diameter of the cylinder.

In the region of the end of the cylinder 16 that faces away from the cylinder base 46, the piston rod 48 passes centrally through a guiding insert part 51. The latter is screwed on the cylinder-end side to the cylinder wall on the inside of the wall. Facing the cylinder space, the guiding insert 51 carries radially on the outside a peripheral seal 52 for sealing off the cylinder space from the outside environment.

Radially on the inside in the region of interaction with the piston rod 48, the guiding insert 51 carries two further seals, disposed spaced apart from each other in the axial direction, an axially inner seal, that is to say facing the cylinder space, being an annular seal 53 and an axially outer seal being formed as a wiping element 54.

The free end of the piston rod 48, protruding axially beyond the cylinder 16 or beyond the guiding insert 51 in the basic position, that is to say when the second piston 17 is supported in the region of the cylinder base 46, carries a functional head 55 in a rotationally fixed manner. In the exemplary embodiment shown, this head serves for engaging a free end of the tool shank 56 of the cutting tool 3 held in the tool holder 4.

The functional head 55 is configured for grasping the free end of the tool shank 56 in the manner of a claw, that is for engagement in an annular groove of the tool shank 56 in the end region of the shank.

Figure 13:
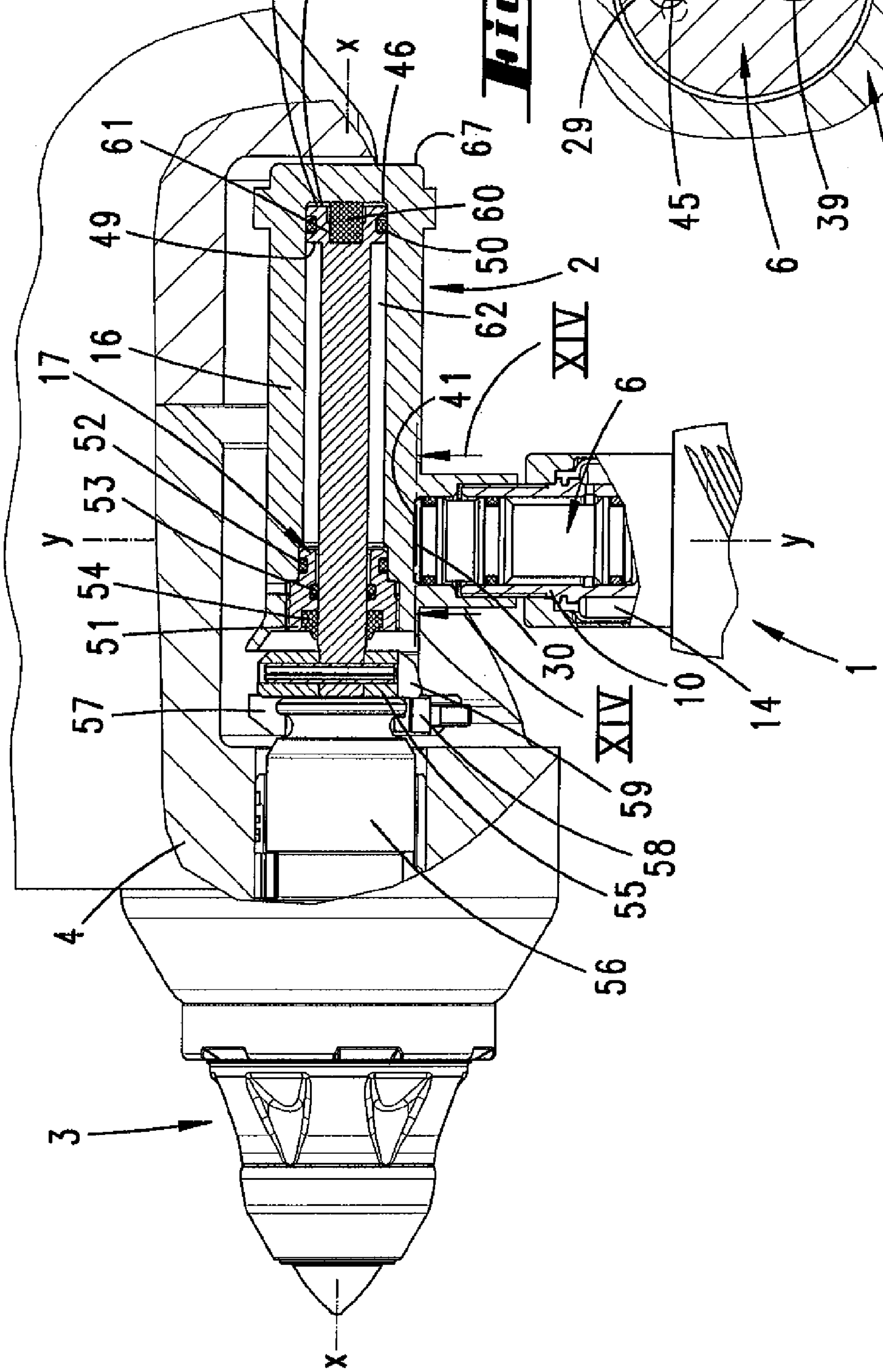
FIG. 13 shows the head region of the hand tool with the associated working head in a sectioned representation, in the placing position of the working head associated with a cutting tool to be driven out of a tool holder by means of the working head.
Figure 14:
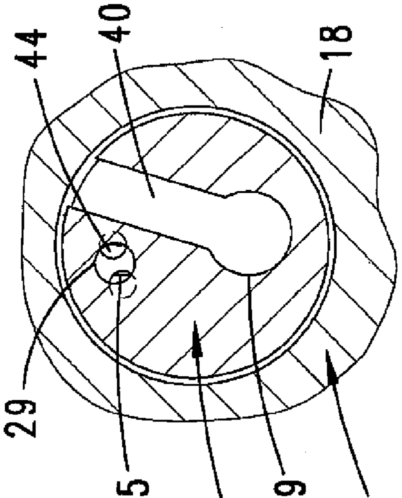
FIG. 14 shows the enlarged section along the line XIV-XIV in FIG. 13.
Figure 15:
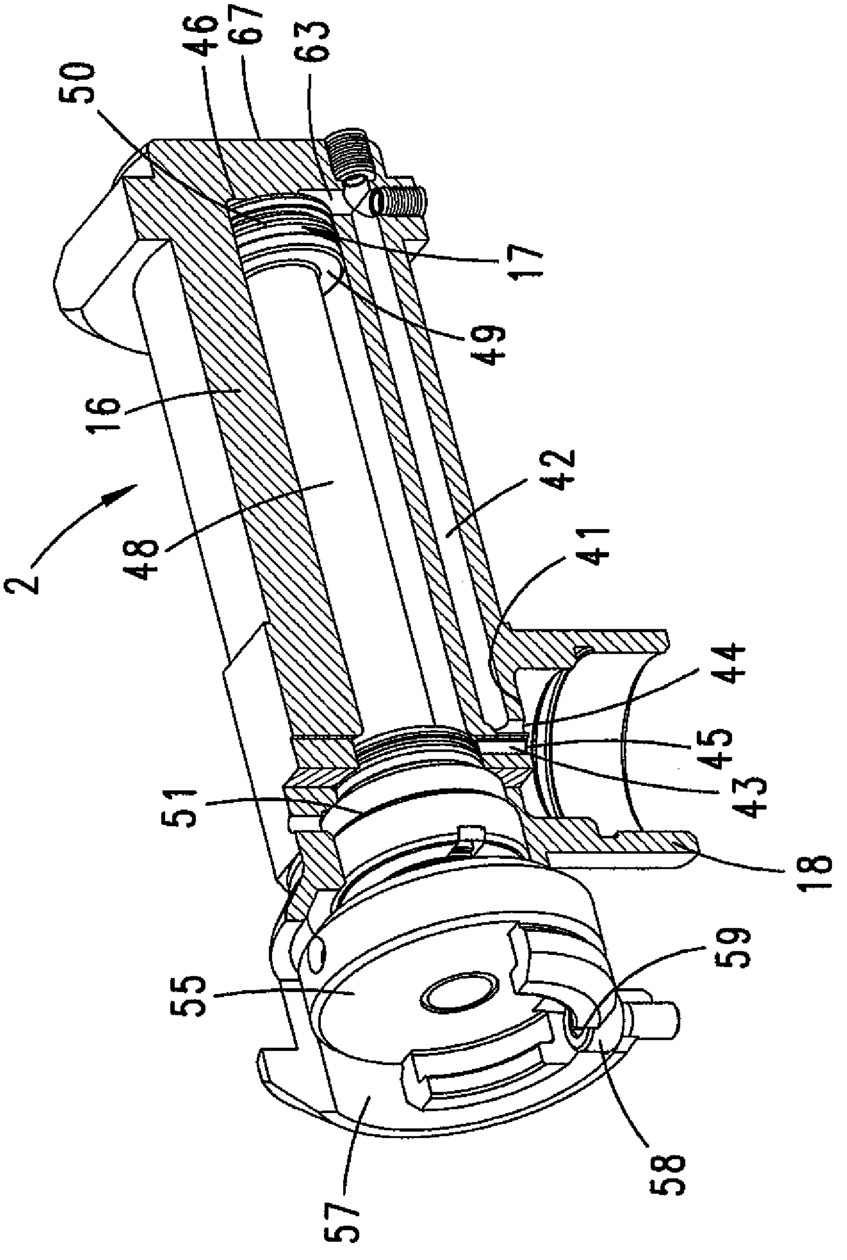
FIG. 15 shows a perspective partially sectioned representation of the working head, for the basic position according to FIG. 13.

In a basic position of the tool according to FIGS. 13 to 15, the functional head 55 is accommodated in a supporting portion 57 that at least partially encloses the functional head 55. This supporting portion is formed from the cylinder wall in one piece, is made from the same material throughout and is pot-like in shape.

Aligned parallel with the flange 18, which furthermore is associated with the end of the cylinder facing away from the cylinder base 46 of the second cylinder, a cam 58 that engages radially in the space for the linear movement of the functional head 55 is secured in the supporting portion 57. In the exemplary embodiment shown, this cam is formed by a screw head of a screw secured in a portion of the lateral surface of the supporting portion 57. The screw head or the cam 58 interacts with an axially aligned groove 59 of the functional head 55 that opens in a wedge-shaped manner. This groove 59 opens radially outwardly. By means of this configuration, when there is a return displacement of the functional head 55 into the basic position, a circumferential alignment of the functional head 55 in the working head 2, and via the latter of the entire piston arrangement, which is otherwise not rotationally fixed, can be achieved by interaction of the cam 58 and the groove 59, in order in this way to drive the functional head 55 out of a basic position that is always the same. Self-centering can be achieved by the widening groove 59 in interaction with the cam 58.

The second piston 17 accommodates a spring element 60 centrally on the side opposite from the piston rod 48. In the exemplary embodiment shown, this element is an elastomer part, which is held in a central bore 61 that opens out in the piston surface 47 and protrudes beyond the associated piston surface 47 by an axial extent of approximately 1 mm to 2 mm.

In an unloaded basic position, the second piston 17 is supported by means of the free end face of the spring element on the associated cylinder base 46, while leaving an annular space surrounding the free end portion of the spring element 60.

The hydraulic path 43 in the cylinder head surface 41 associated with the first piston 6, opening out in the opening 45, extends such that it is aligned parallel with the piston axis y in the manner of a branch channel in a straight line in relation to where it opens out in the annular space 62; the annular space 62 is between the second piston 17 and the guiding insert 51, is passed through by the piston rod 48, and is formed as a pressure space as a result of the sealing provided axially at both ends in the region of the second piston 17 and in the region of the guiding insert 51.

The second hydraulic path 42, opening out in the opening 44 and running parallel to the axis of the second piston 17, passes through the cylinder wall to run out at the end in the region of the cylinder base 46 via a radially inwardly directed transverse channel 63 in the pressure space 64 formed between the cylinder base 46 and the second piston 17.

The entire working head 2, and thus also the piston 17 guided in the head and the cylinder 16, are held on the head 11 such that they are swivelably movable about the piston axis y with respect to the hand tool 1, and thus accordingly also with respect to the first piston 6 that is guided in a rotationally fixed manner in the hand tool 1, this swivelling movement being over a limited angle of swivelling of approximately 17° to 18° in the exemplary embodiment shown. This swivelability also allows relative swivelling displacement of the openings 44 and 45 on the hydraulic-path side to be effected in relation to the outflow opening 29 and the run-off opening 39 on the piston side.

The angle-limited swivelling displacement is achieved by a screw 65 that passes radially through the flange 18, protrudes radially inward beyond the inside wall of the flange and enters there into a recess 66 in the wall of the head, the recess having a clearance. This recess 66 with clearance has a width, viewed in the circumferential direction of the head 11, which, in interaction with the end of the screw, allows the relative swivelling, by the prescribed angular value, of the flange 18 in relation to the head 11.

The following operating mode is obtained:

By steadily increasing the pressure in the pressure space 13 upstream of the first piston 6, the first piston 6 is initially displaced linearly forward in the first cylinder 10, this by the excess dimension of approximately 2 mm of the cylinder 10. Accordingly, the end face 30 of the first piston 6 is pressed against the facing cylinder head surface 41, whereby on the one hand the appointed swivelled position of the hand tool 1 and the working head 2 in relation to one another is fixed, while on the other hand sealing between the first piston 6 and the cylinder head surface 41 is achieved. The displacement of the first piston 6, initially carried but forwardly, is effected by the piston acting as a differential piston. The piston end face 31 facing the pressure space 13 has a larger effective area than the end face 30 facing away from it, which is reduced in terms of its surface area in particular by the portion of the surface taken up by the run-off opening 39 and the enlarged portion 40. Any hydraulic medium that is still between the end face 30 and the cylinder head surface 41 is displaced into the reservoir 14 via the run-off opening 39 and the run-off channel 37.

By further increasing the pressure on the piston surface associated with the end face 31, a threshold value for opening the valve 34 on the inflow-opening side is exceeded. After opening of the valve 34, the same hydraulic medium that brings about the forward displacement of the first piston 6 flows via the inflow channel 27 through the first piston 6 in the direction of the end face 30, where it reaches the second cylinder 16 via the openings 44 and/or 45 which have been brought into a position overlying the outflow opening 29.

For the forward displacement of the second piston 17 in the second cylinder 16, that is to say, in the exemplary embodiment shown for forcing the cutting tool 3 out of the tool holder 4 and corresponding axial outward displacement of the piston rod 48 carrying the functional head 55, a swivelled position between the hand tool 1 and the working head 2 is set in which both openings 44 and 45 of the two hydraulic paths 42 and 43 on the working-head side are in flow-connection with the outflow opening 29 of the inflow channel 27 formed in the first piston 6. As a result of this configuration, a pressure which acts in opposite directions with respect to the second piston 17 is built up on both sides of the second piston 17 via the annular space 62 and the pressure space 64. The different effective area sizes of the area of the piston surface 47 and the piston surface 49 have the resulting effect of achieving a uniform, damped forward displacement of the piston 17, the piston rod 48 and, via the functional head 55, the cutting tool 3 out of the tool holder 4. Furthermore, accordingly, an acceptably dimensioned piston rod 48 with regard to cross-sectional area is achieved because only low disengaging forces are required.

Figure 16:
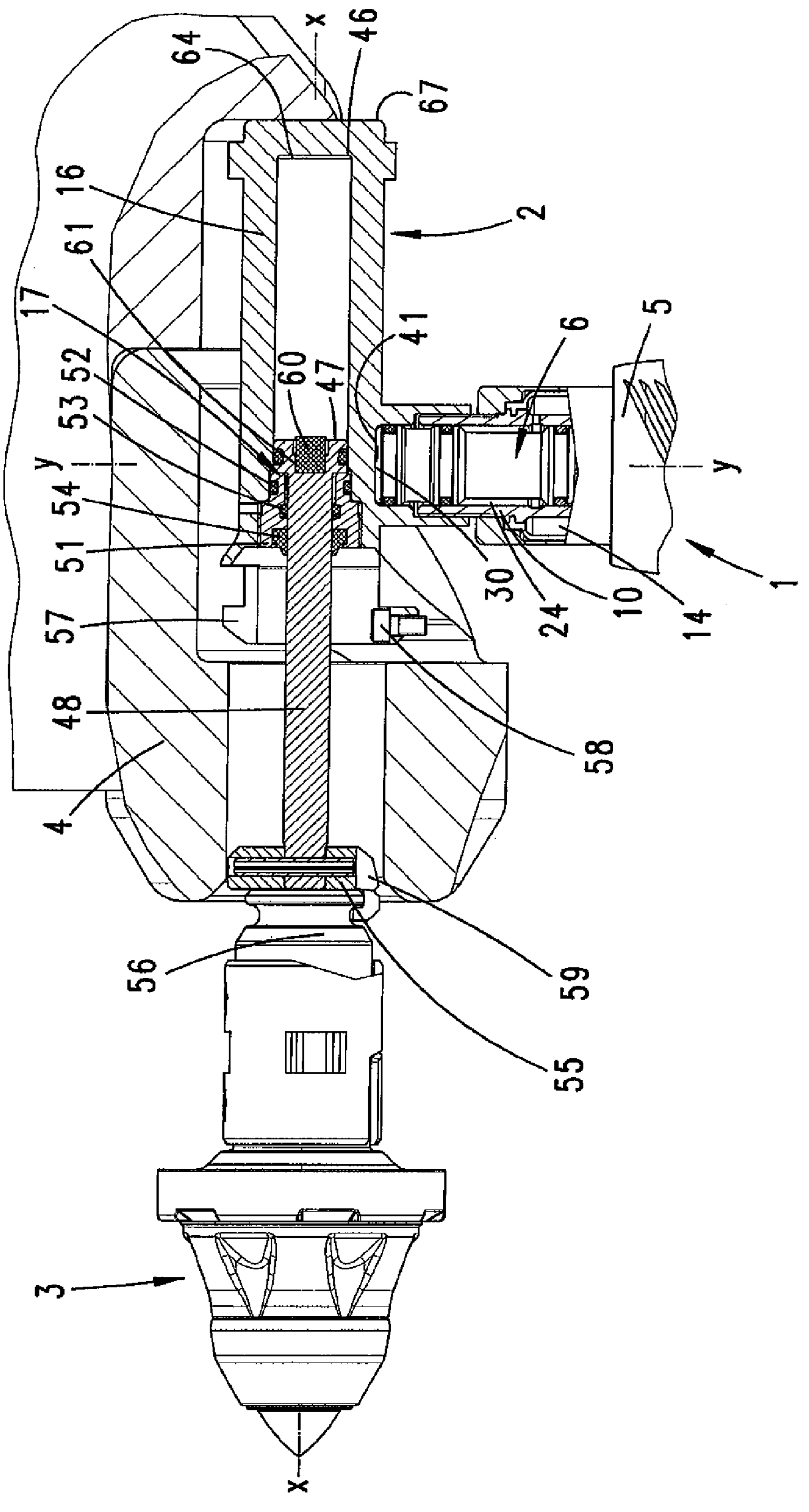
FIG. 16 shows a representation corresponding to FIG. 13, but for the forwardly-displaced disengaging position.
Figure 17:
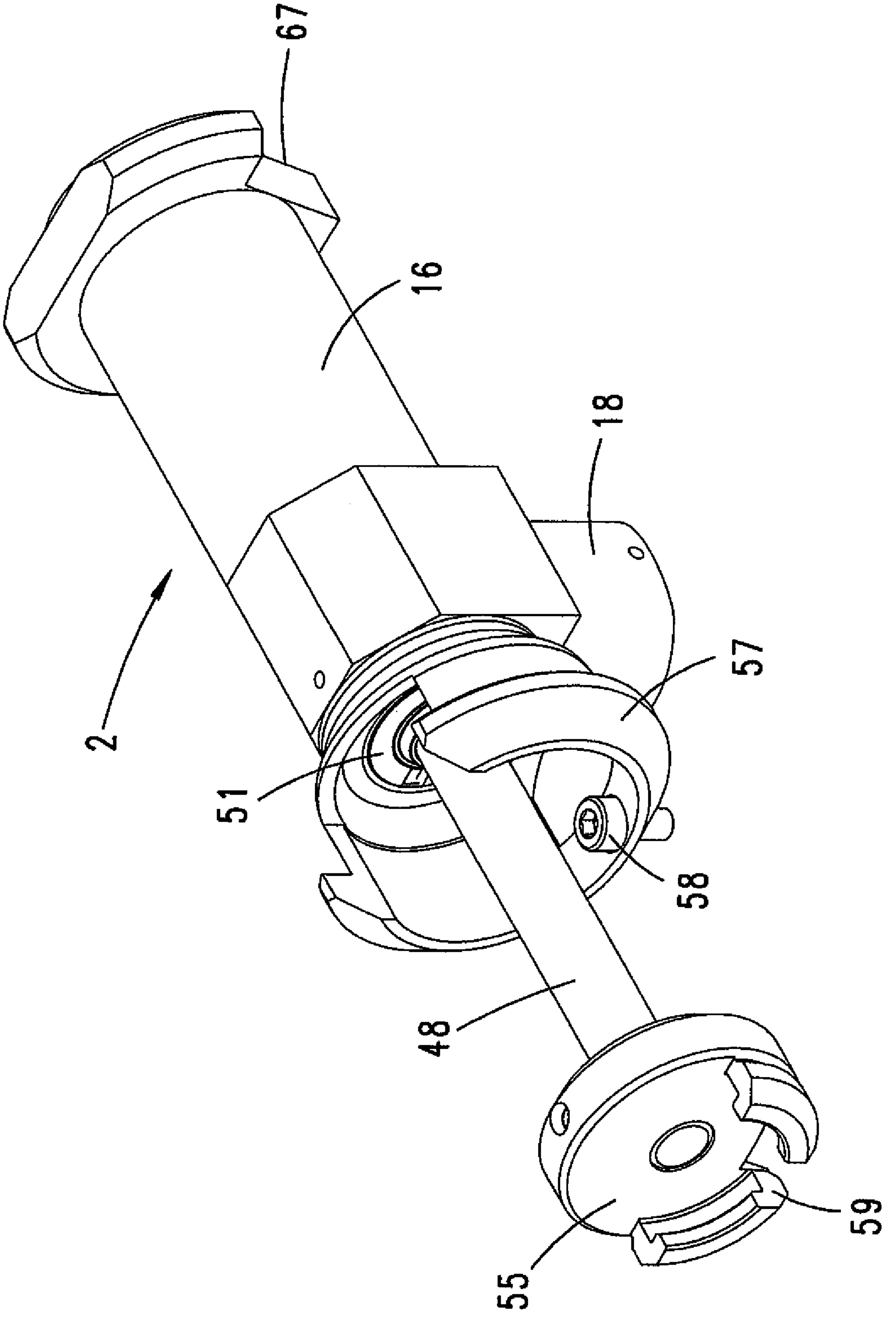
FIG. 17 shows a representation corresponding to FIG. 12, but for the working position according to FIG. 16.
Figure 18:
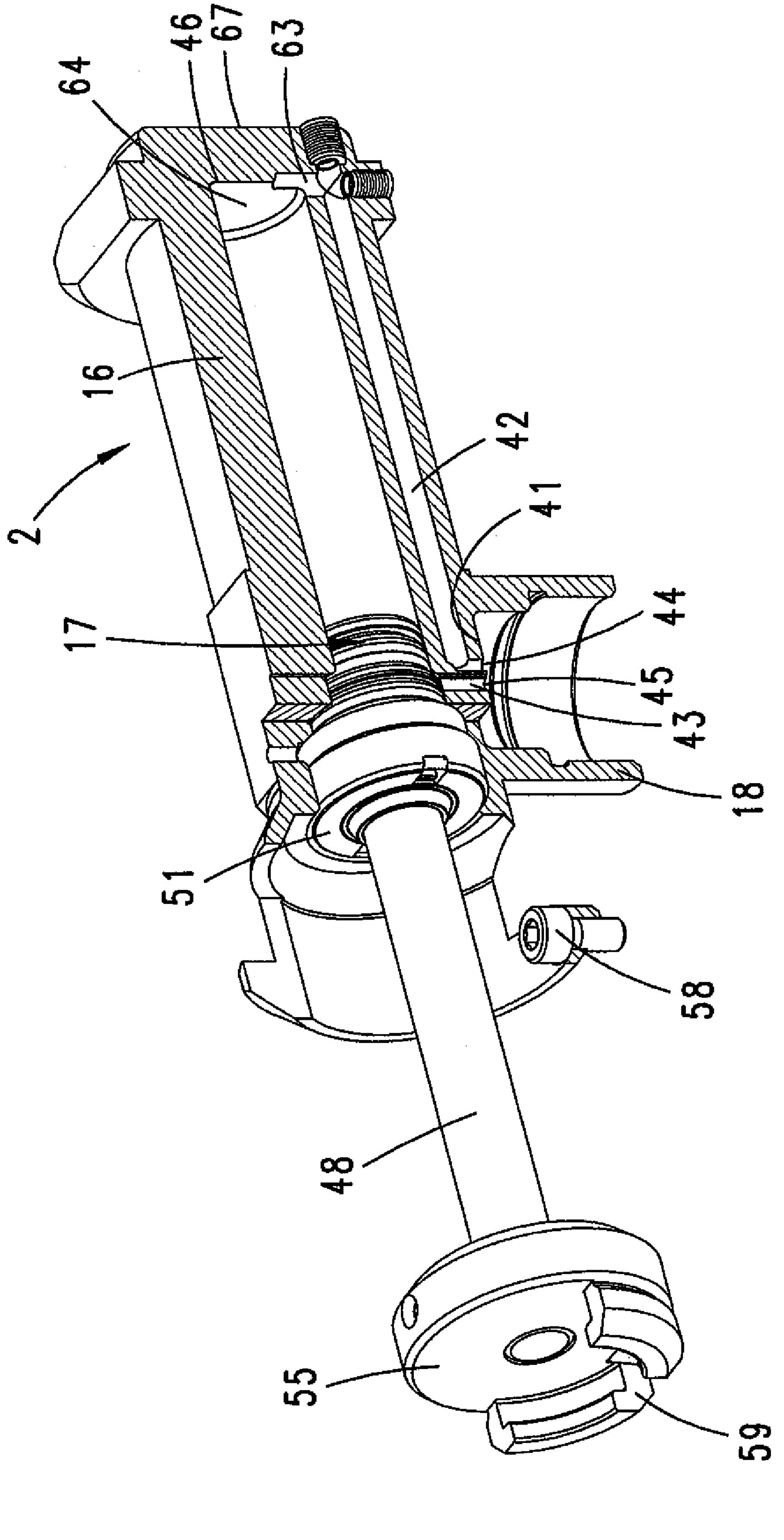
FIG. 18 shows a representation corresponding to FIG. 15, for the working position according to FIGS. 16 and 17.
Figure 19:
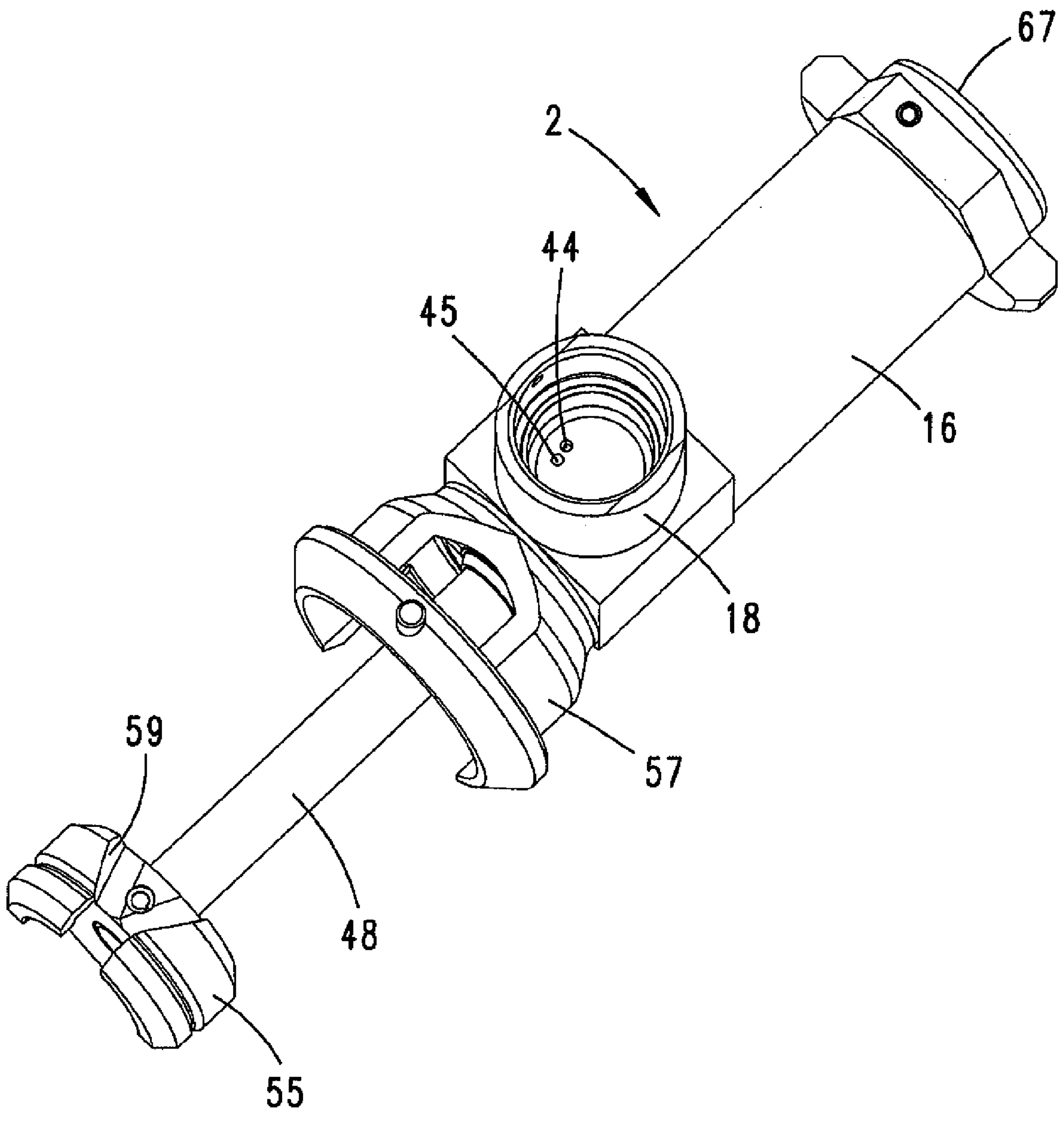
FIG. 19 shows the working head in the working position according to FIG. 16 in a perspective view from below.

In the course of this pressing-out operation, the rearward outer end face 67 of the working head 2, this end face 67 being associated with the cylinder base 46, is supported on a flank of the tool holder 4, which is formed in the manner of a pocket to accommodate the working head 2 (cf. FIG. 16).

For the return displacement of the piston rod 48, for example for reinserting the cutting tool 3 into the tool holder 4, the hand tool 1 is swivelably displaced about the axis y relative to the working head 2 in such a way that afterwards the opening 45 of the hydraulic path 43 is in a position overlying the outflow opening 29 of the inflow channel 27 on the piston side and the opening 44 of the hydraulic path 42 is in a position overlying the enlarged portion 40 of the run-off opening 39. The hydraulic medium accordingly acts under pressure in the annular space 62 on the smaller piston surface 49 of the second piston 17, while the larger piston surface 47, which is rearward in relation to the piston 17, can move away without any pressure on it. The hydraulic medium located in the associated pressure space 64 is forced back into the reservoir 14 via the hydraulic path 42, the opening 44 and further via the enlarged portion 40 and the run-off opening 39.

The ratios selected for the piston areas and actuation of the piston surfaces 47 and 49 by subjecting them to pressure on both sides during forward displacement and the action on one side only on the smaller piston surface during the return displacement of the piston rod 48 have the effect that the rod moves at the same speeds both in the direction of forward displacement and in the direction of return displacement.

Figure 20:
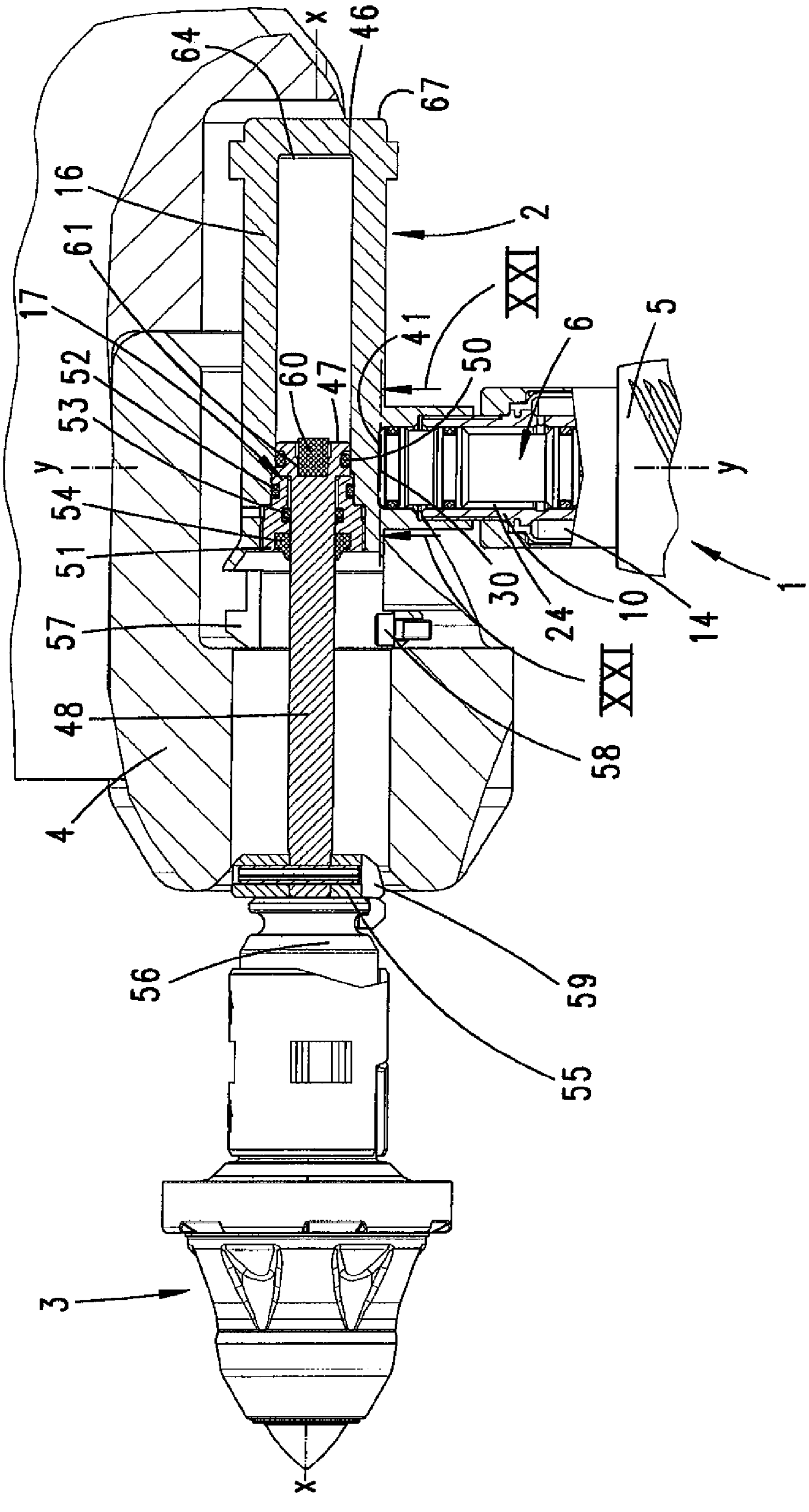
FIG. 20 shows a further representation corresponding to FIG. 13, but for an intermediate position in the course of the return displacement of a piston that is movable in the working head.

In the drawing-in displacement of the piston rod 48, the working head 2 is supported at the end face on the then associated flank of the tool holder 4 (cf. FIG. 20) by means of the supporting portion 57

At the end of the return displacement of the piston rod 48, the protruding spring element 60 of the second piston strikes against the cylinder base 46, which initially brings about a compression of the spring element 60 when further pressure is applied to the smaller piston surface 49. When the hand tool 1 is switched off, for example triggered by the return valve 12, which opens automatically in dependence on a pressure threshold value, the pressure acting on the smaller piston surface 49 is relieved, which triggers subsequent decompression of the spring element 60. This results in a minimal axial displacement of approximately 2 mm of the second piston 17 and, via the second piston, of the piston rod 48 by the extent of the decompression of the spring element 60. The relative displacement between the piston rod 48, supported on the tool shank 56 by means of the functional head 55, and the second cylinder 16 has the result that the supporting portion 57 is at a spacing, albeit small, from the supporting surface.

Figure 22:
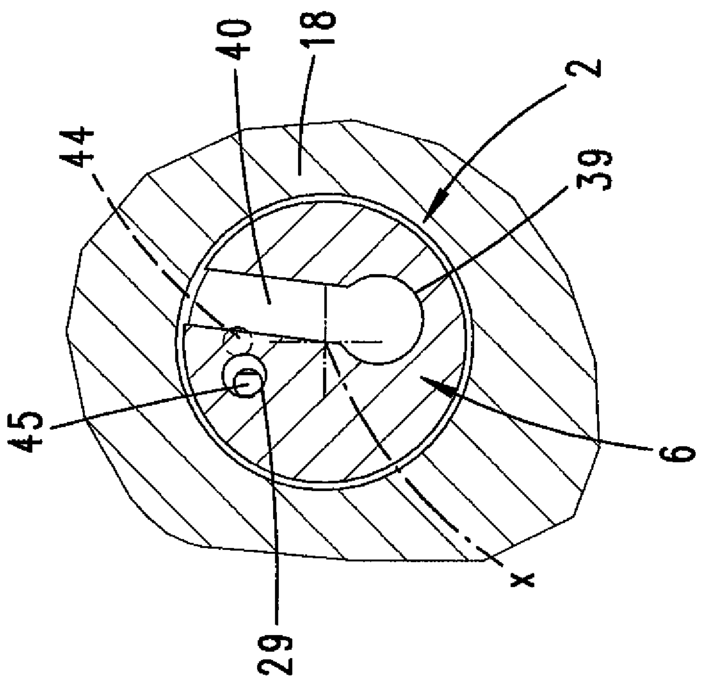
FIG. 22 shows a cross-sectional representation according to FIG. 21, but for an intermediate position.
Figure 21:
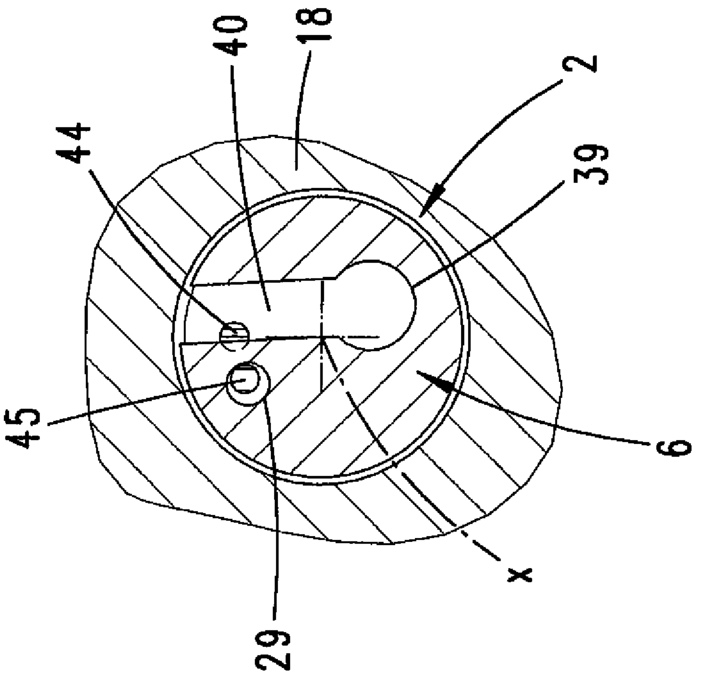
FIG. 21 shows the enlarged section along the line XXI-XXI in FIG. 20

The two swivelled positions between the hand tool 1 and the working head 2 that are described above correspond to the end positions of swivelling. As can be further gathered from the representation in FIG. 22, an intermediate swivelled position is passed through in the course of the swivelling change-over, in which position the opening 45 of the hydraulic path 43 connected to the annular space 62 is in connection with the inflow channel 27 of the first piston 6 and the opening 44 of the hydraulic path 42 extending to the pressure space 64 overlies the enlarged portion 40 to a slight, but functionally adequate, extent. In this intermediate swivelled position, the second piston 17 in the working head 2 is not subjected to pressure.

When the automatic return valve 12 comes into action, the pressure-limiting valve 34 in the first piston 6 may be loaded in the closing direction by the hydraulic medium flowing back. In a development, the valve 34 may be formed in such a way that, in the closing direction, it opens even under slight pressure, that is to say it accordingly represents a pressure-limiting valve acting in both directions. Alternatively, an additional conventional return valve, which allows the return flow of the hydraulic medium, may also be disposed in the first piston 6.

All features disclosed are (in themselves) pertinent to the invention. The disclosure content of the associated/accompanying priority documents (copy of the prior patent application) is also hereby incorporated in full in the disclosure of the application, including for the purpose of incorporating features of these documents in claims of the present application.

LIST OF DESIGNATIONS

1 hand tool
2 working head
3 cutting tool
4 tool holder
5 housing
6 first piston
7 grip region
8 storage battery
9 pump plunger
10 first cylinder
11 head
12 return valve
13 pressure space
14 reservoir
15 actuating switch
16 second cylinder
17 second piston
18 flange
19 widened portion
20 widened portion
21 widened portion
22 annular grooves
23 ring seals
24 annular space
25 annular space
26 bore
27 inflow channel
28 inflow opening
29 outflow opening
30 end face
31 end face
32 axial continuation
33 axial slot guide
34 valve
35 ball
36 compression spring
37 run-off channel
38 transverse bore
39 run-off opening
40 enlarged portion
41 cylinder head surface
42 hydraulic path
43 hydraulic path
44 opening
45 opening

46 cylinder base
47 piston surface
48 piston rod
49 piston surface
50 annular piston seal
51 guiding insert
52 ring seal
53 annular seal
54 wiper
55 functional head
56 tool shank
57 supporting portion
58 cam
59 groove
60 spring element
61 bore
62 annular space
63 transverse channel
64 pressure space
65 screw
66 recess with clearance
67 outer end face
68 bore
69 screw plug
A inflow side
B outflow side
x longitudinal axis of the second piston
y longitudinal axis of the first piston

The invention claimed is:

1. Hand tool comprising:

a working head having a cylinder, a piston mounted in said cylinder, first and second hydraulic paths formed in said working head, a first space between said cylinder and said piston, and a second space between said cylinder and said piston, said piston capable of being moved in a first direction relative to said cylinder and being capable of being moved in a second direction relative to said cylinder, said second direction being opposite to said first direction;

a body unit attached to the working head, said body unit including drive elements for driving the working head, a piston and a reservoir, said working head and said body unit being swivelable relative to each other such that said working head can be positioned in a first position relative to said body unit and said working head can be positioned in a second, different position relative to said body unit, said first and second positions of the working head relative to the body unit can be fixed in place by direct abutment between the piston of said body unit and the working head;

hydraulic medium provided within said working head and within said reservoir of said body unit;

said hydraulic paths in said working head capable of being in fluid communication with said hydraulic medium in said reservoir of said body unit, said first path directing hydraulic medium from said reservoir of said body unit to said first space to effect movement of the piston in said first direction, and said second path directing hydraulic medium from said reservoir of said body unit to said second space to effect movement of the piston in said second direction, wherein movement of said piston in said first direction can be effected when said working head is in said first position, and movement of said piston in said second direction can be effected when said working head is in said second position.

2. Hand tool according to claim 1 wherein said piston has a longitudinal axis, said working head swivels about the longitudinal axis of the piston of said body unit when said working head is moved from said first position to said second position, the longitudinal axis extending in the direction of movement of the piston of said body unit.

3. Hand tool according to claim 2, wherein the piston of said body unit is rotationally fixed in said body unit.

4. Hand tool according to claim 3, wherein the working head includes a member therethrough which engages with a recess in said body unit to permit the working head to move only along a predetermined angle relative to said body unit.

5. Hand tool according to claim 3, wherein said piston in said working head has a longitudinal axis, the longitudinal axes of the pistons in said body unit and said working head are not parallel to each other.

6. Hand tool according to claim 3, wherein said piston mounted in said body unit is perpendicular relative to said piston mounted in said working head.

7. Hand tool according to claim 3, wherein said piston of said body unit has a passageway through which the hydraulic medium flows.

8. Hand tool according to claim 7, wherein said passageway has an inflow side and an outflow side, said inflow side having a larger effective area than an effective area on the outflow side, the effective area on the outflow side being provided by a portion of a surface connected to a substantially pressure-free hydraulic return.

9. Hand tool according to claim 8, wherein an inflow opening of the passageway of the piston of said body unit has a pre-loaded valve provided therein.

10. Hand tool according to claim 3, wherein the piston of said working head is a double-acting piston and can be acted upon by the hydraulic medium, at least for movement in one direction, but can be acted upon by the hydraulic medium at the same time in opposite directions.

11. Hand tool according to claim 3, wherein the piston of said working head has at an end thereof a functional head that protrudes beyond the cylinder of said working head.

12. Hand tool according to claim 3, wherein said cylinder of said working head has a base, the piston of said working head has a protruding spring element engaging with the base of said cylinder of said working head.

13. Hand tool according to claim 3, wherein an outflow opening and a run-off opening are formed in an end face of the piston of said body unit.

14. Hand tool according to claim 13, wherein a run-offline in fluid communication with the run-off opening is formed in the piston of said body unit, said run-off line opens into said reservoir in said body unit.

15. Hand tool according to claim 13, wherein said piston of said working head has an end and a rod extending therefrom, said rod having an outer dimension which is smaller than said end such that said first space is formed between said rod and said cylinder of said working head, and said hydraulic paths are formed in the cylinder of said working head and form two openings associated with the end face of the piston of said body unit.

16. Hand tool according to claim 15, wherein the two openings are disposed in a region through which the outflow opening passes through when said working head moves from said first position to said second position, and in that at least one of the openings is disposed in a region through which the run-off opening passes through when said working head moves from said first position to said second position.

17. Hand tool according to claim 15, wherein both openings can be positioned with respect to the outflow opening such that hydraulic medium flows simultaneously through both openings.

18. Hand tool according to claim 3, wherein the piston of said working head is circumferentially aligned within said cylinder of said working head by a catching recess formed on the cylinder of said working head.

* * * * *